United States Patent
Kim et al.

(10) Patent No.: US 11,864,179 B2
(45) Date of Patent: Jan. 2, 2024

(54) METHOD AND APPARATUS FOR TRANSMITTING AND RECEIVING PDCCH IN WIRELESS COMMUNICATION SYSTEM

(71) Applicant: LG ELECTRONICS INC., Seoul (KR)

(72) Inventors: Kyuseok Kim, Seoul (KR); Hyungtae Kim, Seoul (KR); Jiwon Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/088,176

(22) Filed: Dec. 23, 2022

(65) Prior Publication Data

US 2023/0126866 A1 Apr. 27, 2023

Related U.S. Application Data

(63) Continuation of application No. 17/802,452, filed as application No. PCT/KR2021/002886 on Mar. 9, 2021.

(30) Foreign Application Priority Data

Mar. 10, 2020 (KR) .......................... 10-2020-0029630
Mar. 26, 2020 (KR) .......................... 10-2020-0036836
(Continued)

(51) Int. Cl.
*H04W 72/231* (2023.01)
*H04W 72/1273* (2023.01)

(52) U.S. Cl.
CPC ..... *H04W 72/1273* (2013.01); *H04W 72/231* (2023.01)

(58) Field of Classification Search
CPC . H04L 25/0204; H04L 5/0053; H04L 5/0051; H04L 25/0224; H04L 5/002;
(Continued)

(56) References Cited

U.S. PATENT DOCUMENTS

2020/0221428 A1* 7/2020 Moon ................... H04L 1/1854
2020/0351926 A1* 11/2020 Bagheri ................ H04W 72/23
(Continued)

FOREIGN PATENT DOCUMENTS

WO 2018217063 11/2018

OTHER PUBLICATIONS

NTT Docomo, Inc., "Offline summary for PDCCH structure and search space," 3GPP TSG-RAN WG1 Meeting #94bis, R1-1811820, Oct. 2018, 66 pages.
(Continued)

*Primary Examiner* — Chi Ho A Lee
*Assistant Examiner* — Andrew Lee
(74) *Attorney, Agent, or Firm* — LEE, HONG, DEGERMAN, KANG & WAIMEY

(57) ABSTRACT

Disclosed are a method and apparatus for transmitting and receiving a physical downlink control channel (PDCCH) in a wireless communication system. A method for receiving a PDCCH, according to an embodiment of the present disclosure, may comprise the steps of: receiving, from a base station, configuration information related to a control resource set (CORESET); and receiving, from the base station, a PDCCH within the CORESET. The configuration information may include transmission control indicator (TCI) state information related to the CORESET, the TCI state information may include information about one or more reference signals which are in a quasi-co-location (QCL) relationship with one or more antenna ports of a demodulation reference signal (DMRS) of the PDCCH, and
(Continued)

a plurality of TCI states may be configured for the CORE-SET.

6 Claims, 26 Drawing Sheets

(30) Foreign Application Priority Data

Apr. 6, 2020 (KR) .................. 10-2020-0041626
May 19, 2020 (KR) .................. 10-2020-0059870
Oct. 23, 2020 (KR) .................. 10-2020-0138427

(58) Field of Classification Search
CPC ............ H04W 72/1273; H04W 72/231; H04B 17/318; H04B 17/391; H04B 17/364
See application file for complete search history.

(56) References Cited

U.S. PATENT DOCUMENTS

| | | | | |
|---|---|---|---|---|
| 2021/0028843 A1* | 1/2021 | Zhou | .................. | H04B 7/063 |
| 2021/0185688 A1* | 6/2021 | Venugopal | .......... | H04B 7/0695 |
| 2021/0243734 A1* | 8/2021 | Zhang | ................ | H04W 72/23 |
| 2021/0250141 A1* | 8/2021 | Shimezawa | .......... | H04L 5/0064 |
| 2021/0289443 A1* | 9/2021 | Nam | ................ | H04B 7/0695 |
| 2021/0320710 A1* | 10/2021 | Koskela | ............ | H04B 17/309 |
| 2021/0329611 A1* | 10/2021 | Karjalainen | ......... | H04B 7/0695 |
| 2022/0116183 A1* | 4/2022 | Gao | .................. | H04L 1/1861 |
| 2022/0240116 A1* | 7/2022 | Ma | ................... | H04W 74/0833 |

OTHER PUBLICATIONS

Huawei, HiSilicon, "Summary of Enhancements on Multi-TRP/Panel Transmission," 3GPP TSG-RAN WG1 Meeting #98, R1-1909602, Sep. 2019, 77 pages.
Samsung, "Enhancements on Multi-TRP/Panel Transmission," 3GPP TSG-RAN WG1 Meeting #96bis, R1-1904449, Mar. 2019, 12 pages.
Ericsson, "On multi-TRP and multi-panel," 3GPP TSG-RAN WG1 Meeting RAN1 #97, R1-1907418, May 2019, 20 pages.
PCT International Application No. PCT/KR2021/002886, International Search Report dated Jun. 24, 2021, 4 pages.
Korean Intellectual Property Office Application Serial No. 10-2022-7028403, Office Action dated Feb. 8, 2023, 4 pages.
Huawei, HiSilicon, "Further discussion on scenarios and transmission schemes for NR Rel-16 Hst," 3GPP TSG-RAN WG4 #92Bis, R4-1912745, Oct. 2019, 4 pages.
CMCC, "Discussion on DL multi-TRP transmission," 3GPP TSG-RAN WG1 #94bis, R1-1811048, Oct. 2018, 3 pages.
Intel Corporation, "Views on DL transmission schemes for NR HST-SFN," 3GPP TSG-RAN WG4 #93, R4-1913428, Nov. 2019, 7 pages.

* cited by examiner

FIG.10

(a) One of NCJT/SFN or one of FDMSchemeA/FDMSchemeB/TDMSchemeA (b) NCJT or one of SFN/FDMSchemeA/FDMSchemeB/TDMSchemeA (c) SFN or NCJT or one of SFN/FDMSchemeA/FDMSchemeB/TDMSchemeA

FIG.15

(a) Antenna port(s) field: 1000, 1002
↓
Number of Tx Layers: 1

$\begin{cases} y^{(1000)}(i) = x^{(0)}(i) \\ y^{(1002)}(i) = x^{(0)}(i) \end{cases}$ (b) Antenna port(s) field: 1000, 1001, 1002, 1003
↓
Number of Tx Layers: 2

$\begin{cases} \begin{bmatrix} y^{(1000)}(i) \\ y^{(1001)}(i) \end{bmatrix} = \begin{bmatrix} x^{(0)}(i) \\ x^{(1)}(i) \end{bmatrix} \\ \begin{bmatrix} y^{(1002)}(i) \\ y^{(1003)}(i) \end{bmatrix} = \begin{bmatrix} x^{(0)}(i) \\ x^{(1)}(i) \end{bmatrix} \end{cases}$

FIG.16

(a) Antenna port(s) field: 1000, 1001, 1002
↓
Number of Tx Layers: 1

$$\begin{cases} \begin{bmatrix} y^{(1000)}(i) \\ y^{(1001)}(i) \end{bmatrix} = \begin{bmatrix} x^{(0)}(i) \\ x^{(0)}(i) \end{bmatrix} \\ y^{(1002)}(i) = x^{(0)}(i) \end{cases}$$

(b) Antenna port(s) field: 1000, 1001, 1002
↓
Number of Tx Layers: 2

$$\begin{cases} \begin{bmatrix} y^{(1000)}(i) \\ y^{(1001)}(i) \end{bmatrix} = \begin{bmatrix} x^{(0)}(i) \\ x^{(1)}(i) \end{bmatrix} \\ y^{(1002)}(i) = x^{(0)}(i) \end{cases}$$

(a)

(b)

METHOD AND APPARATUS FOR TRANSMITTING AND RECEIVING PDCCH IN WIRELESS COMMUNICATION SYSTEM

CROSS-REFERENCE TO RELATED APPLICATIONS

This application is a continuation of U.S. patent application Ser. No. 17/802,452, filed on Aug. 25, 2022, which is the National Stage filing under 35 U.S.C. 371 of International Application No. PCT/KR2021/002886, filed on Mar. 9, 2021, which claims the benefit of earlier filing date and right of priority to Korean Application Nos. 10-2020-0029630, filed on Mar. 10, 2020, 10-2020-0036836, filed Mar. 26, 2020, 10-2020-0041626, filed Apr. 6, 2020, 10-2020-0059870, filed May 19, 2020, and 10-2020-0138427, filed Oct. 23, 2020, the contents of which are all incorporated by reference herein in their entireties.

TECHNICAL FIELD

The present disclosure relates to a wireless communication system, and in more detail, relates to a method and an apparatus of transmitting and receiving a physical downlink control channel (PDCCH) in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

A technical object of the present disclosure is to provide a method and an apparatus for transmitting and receiving a physical downlink control channel (PDCCH).

In addition, an additional technical object of the present disclosure is to provide a method and an apparatus for transmitting and receiving a physical downlink control channel (PDCCH) based on a single frequency network (SFN).

The technical objects to be achieved by the present disclosure are not limited to the above-described technical objects, and other technical objects which are not described herein will be clearly understood by those skilled in the pertinent art from the following description.

Technical Solution

A method of receiving a physical downlink control channel (PDCCH) in a wireless communication system according to an aspect of the present disclosure may include: receiving, from a base station, configuration information related to a control resource set (CORESET); and receiving, from the base station, a PDCCH in the CORESET. The configuration information may include transmission control indicator (TCI) state information related to the CORESET, the TCI state information may include information on one or more reference signals having a quasi co-location (QCL) relationship with one or more antenna ports of a demodulation reference signal (DMRS) of the PDCCH, and a plurality of TCI states may be configured for the CORESET.

A terminal of receiving a physical downlink control channel (PDCCH) in a wireless communication system according to an additional aspect of the present disclosure may include: at least one transceiver for transmitting and receiving a radio signal; and at least one processor for controlling the at least one transceiver. The at least one processor may be configured to: receive, from the base station, a PDCCH in the CORESET; and receive, from the base station, a PDCCH in the CORESET. The configuration information may include transmission control indicator (TCI) state information related to the CORESET, the TCI state information may include information on one or more reference signals having a quasi co-location (QCL) relationship with one or more antenna ports of a demodulation reference signal (DMRS) of the PDCCH, and a plurality of TCI states are configured for the CORESET.

At least one non-transitory computer-readable medium storing at least one instruction according to an additional aspect of the present disclosure may control a device for receiving a physical downlink control channel (PDCCH) to: receive, from a base station, configuration information related to a control resource set (CORESET); and receive, from the base station, a PDCCH in the CORESET. The configuration information may include transmission control indicator (TCI) state information related to the CORESET, the TCI state information may include information on one or more reference signals having a quasi co-location (QCL) relationship with one or more antenna ports of a demodulation reference signal (DMRS) of the PDCCH, and a plurality of TCI states may be configured for the CORESET.

A processing apparatus configured to control a terminal to receive a physical downlink control channel (PDCCH) in a wireless communication system may include: at least one processor; and at least one computer memory operably connected to the at least one processor and storing instructions that, based on being executed by the at least one processor. The operations may include receiving, from a base station, configuration information related to a control resource set (CORESET); and receiving, from the base station, a PDCCH in the CORESET. The configuration information may include transmission control indicator (TCI) state information related to the CORESET, the TCI state information may include information on one or more reference signals having a quasi co-location (QCL) relationship with one or more antenna ports of a demodulation reference signal (DMRS) of the PDCCH, and a plurality of TCI states may be configured for the CORESET.

A method of transmitting a physical downlink control channel (PDCCH) in a wireless communication system according to an additional aspect of the present disclosure may include: transmitting, to a terminal, configuration information related to a control resource set (CORESET); and transmitting, to the terminal, a PDCCH in the CORESET. The configuration information may include transmission control indicator (TCI) state information related to the CORESET, the TCI state information may include information on one or more reference signals having a quasi co-location (QCL) relationship with one or more antenna ports of a demodulation reference signal (DMRS) of the PDCCH, and a plurality of TCI states may be configured for the CORESET.

A base station for transmitting a physical downlink control channel (PDCCH) in a wireless communication system according to an additional aspect of the present disclosure may include: at least one transceiver for transmitting and receiving a radio signal; and at least one processor for controlling the at least one transceiver. The at least one processor is configured to: transmit, to a terminal, configuration information related to a control resource set (CORESET); and transmit, to the terminal, a PDCCH in the CORESET. The configuration information may include transmission control indicator (TCI) state information related to the CORESET, the TCI state information may include information on one or more reference signals having a quasi co-location (QCL) relationship with one or more antenna ports of a demodulation reference signal (DMRS) of the PDCCH, and a plurality of TCI states may be configured for the CORESET.

Advantageous Effects

According to an embodiment of the present disclosure, reliability for downlink control information transmission and reception can be improved by transmitting and receiving a PDCCH using an SFN technique.

In addition, according to an embodiment of the present disclosure, channel estimation performance can be improved by performing channel estimation/compensation based on different reference signals for a PDCCH transmitted/received using an SFN technique.

In addition, according to an embodiment of the present disclosure, complexity of a terminal UE cannot increase for high estimation performance by performing channel estimation/compensation for a PDCCH transmitted/received using an SFN technique based on different reference signals.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

FIG. 10 illustrates a method of configuring whether to operate an SFN according to an embodiment of the present disclosure.

FIG. 15 is a diagram illustrating DMRS antenna port to layer mapping according to an embodiment of the present disclosure.

FIG. 16 is a diagram illustrating DMRS antenna port to layer mapping according to an embodiment of the present disclosure.

BEST MODE

Figure 1:
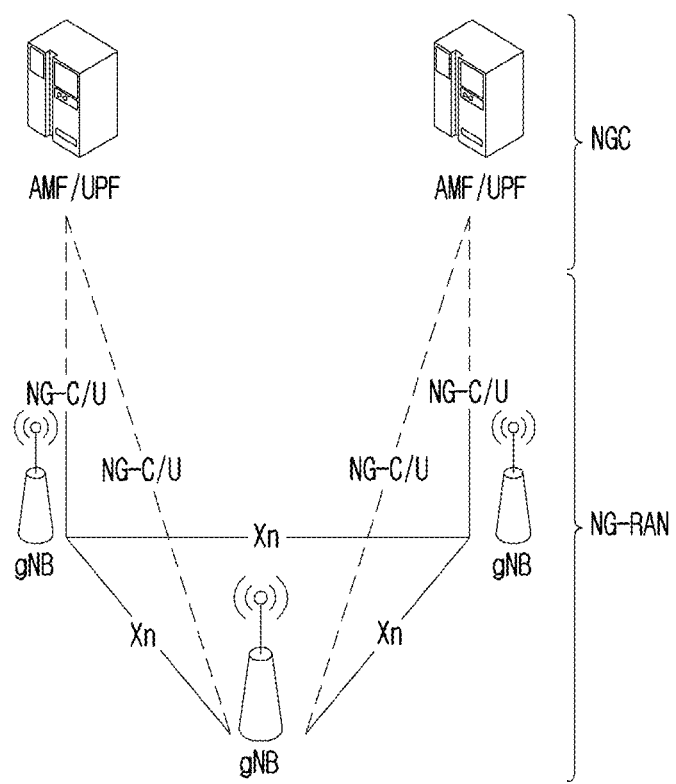
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB(evolved-NodeB), a gNB(Next Generation NodeB), a BTS(base transceiver system), an Access Point(AP), a Network(5G network), an AI(Artificial Intelligence) system/module, an RSU(road side unit), a robot, a drone(UAV: Unmanned Aerial Vehicle), an AR(Augmented Reality) device, a VR(Virtual Reality) device, etc. In addition, a terminal may be fixed or mobile, and may be substituted with a term such as a UE(User Equipment), an MS(Mobile Station), a UT(user terminal), an MSS(Mobile Subscriber Station), an SS(Subscriber Station), an AMS(Advanced Mobile Station), a WT(Wireless terminal), an MTC(Machine-Type Communication) device, an M2M(Machine-to-Machine) device, a D2D(Device-to-Device) device, a vehicle, an RSU(road side unit), a robot, an AI(Artificial Intelligence) module, a drone(UAV: Unmanned Aerial Vehicle), an AR(Augmented Reality) device, a VR(Virtual Reality) device, etc.

The following description may be used for a variety of radio access systems such as CDMA, FDMA, TDMA, OFDMA, SC-FDMA, etc. CDMA may be implemented by a wireless technology such as UTRA(Universal Terrestrial Radio Access) or CDMA2000. TDMA may be implemented by a radio technology such as GSM(Global System for Mobile communications)/GPRS(General Packet Radio Service)/EDGE(Enhanced Data Rates for GSM Evolution). OFDMA may be implemented by a radio technology such as IEEE 802.11(Wi-Fi), IEEE 802.16(WiMAX), IEEE 802-20, E-UTRA(Evolved UTRA), etc. UTRA is a part of a UMTS (Universal Mobile Telecommunications System). 3GPP(3rd Generation Partnership Project) LTE(Long Term Evolution) is a part of an E-UMTS(Evolved UMTS) using E-UTRA and LTE-A(Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS(Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN(New Generation-Radio Access Network) overall description), TS 38.331(radio resource control protocol specification) may be referred to.

Abbreviations of terms which may be used in the present disclosure is defined as follows.
BM: beam management
CQI: Channel Quality Indicator
CRI: channel state information—reference signal resource indicator
CSI: channel state information CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB(enhanced mobile broadband communication), mMTC(massive MTC), URLLC(Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA(NG-Radio Access) user plane (i.e., a new AS(access stratum) sublayer/PDCP(Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF(Access and Mobility Management Function) through an N2 interface, and is connected to a UPF(User Plane Function) through an N3 interface.

Figure 2:
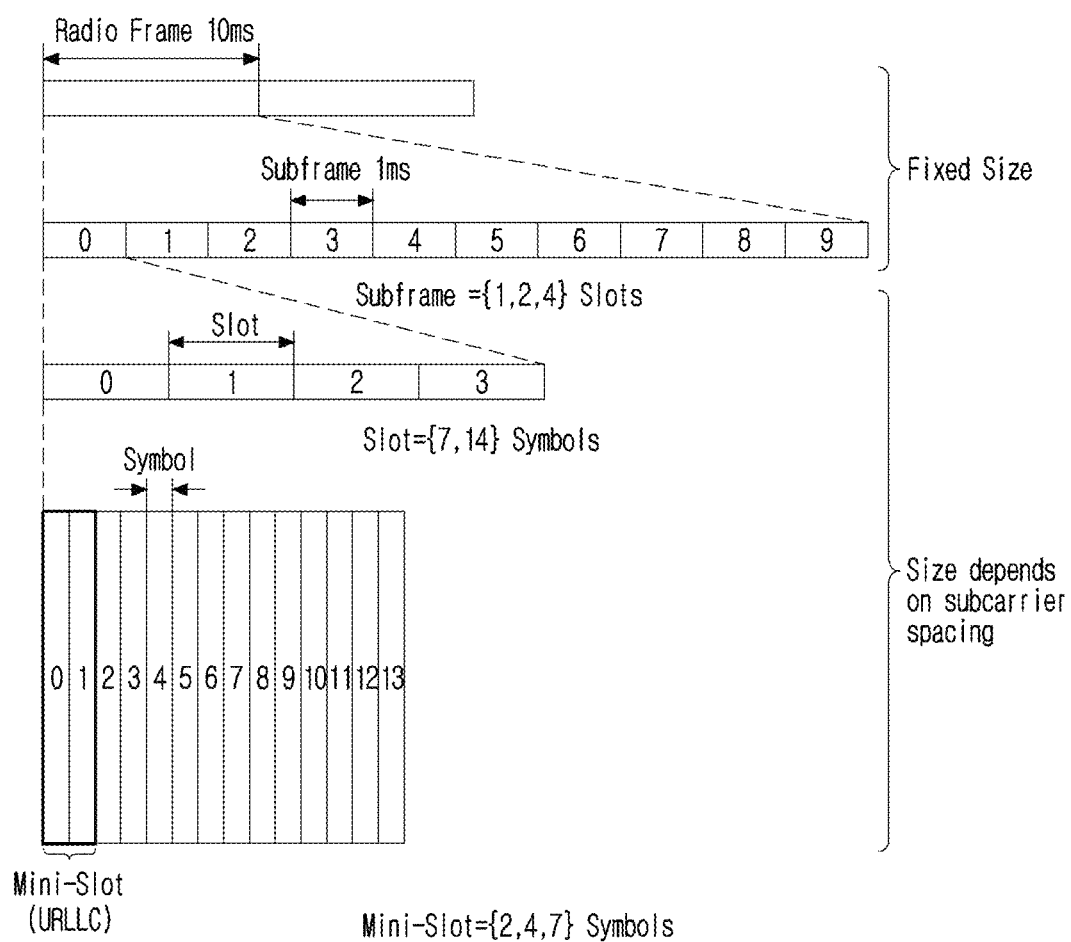
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
| --- | --- | --- |
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise. An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·10³ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{10, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used. Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols. Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL(quasi co-located or quasi co-location) relationship. In this case, the large-scale property includes at least one of delay spread, doppler spread, frequency shift, average received power, received timing.

Figure 3:
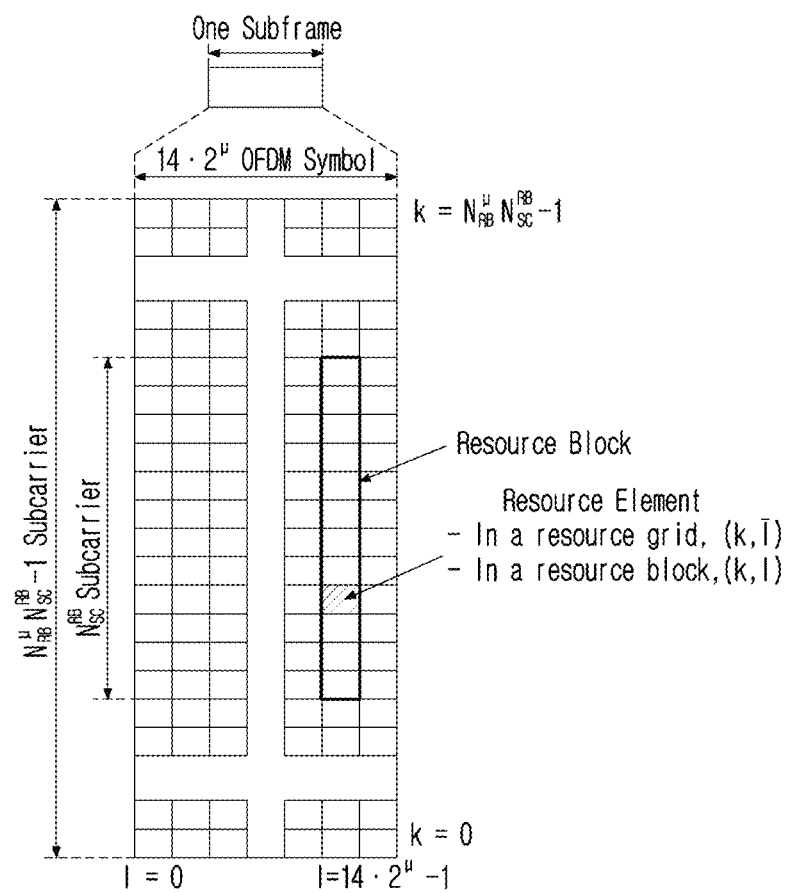
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with 14·2$^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, k=0, . . . , $N_{RB}^\mu N_{sc}^{RB}-1$ is an index in a frequency domain and l'=0, . . . , $2^\mu N_{symb}^{(\mu)}-1$ refers to a position of a symbol in a subframe. When referring to a resource element in a slot, an index pair (k,l) is used. Here, l=0, . . . , $N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^\mu = n_{PRB}^\mu + N_{BWP,i}^{start,\mu} \quad \text{[Equation 2]}$$

$N_{BWP,i}^{start,\mu}$ is a common resource block that a BWP starts relatively to common resource block 0.

Figure 4:
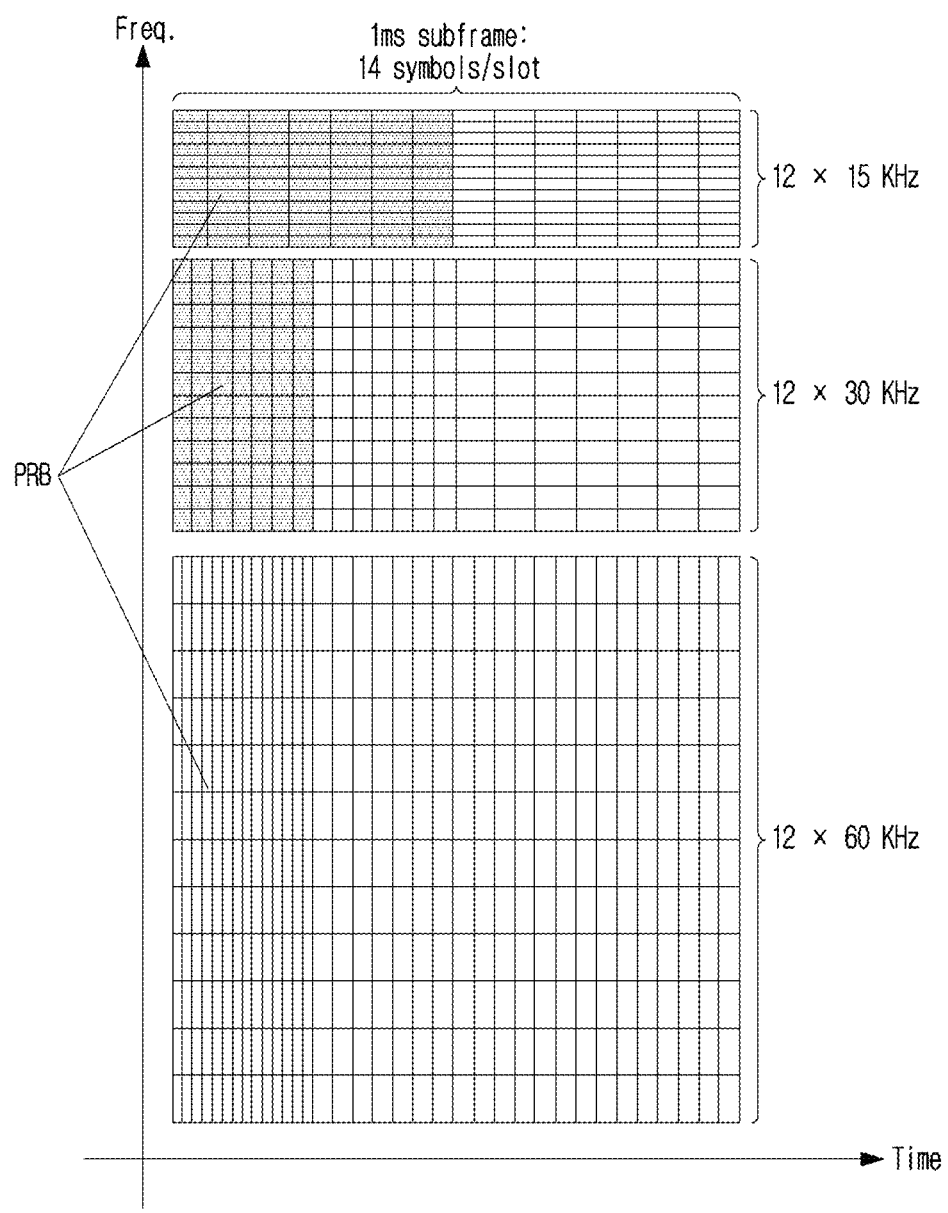
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
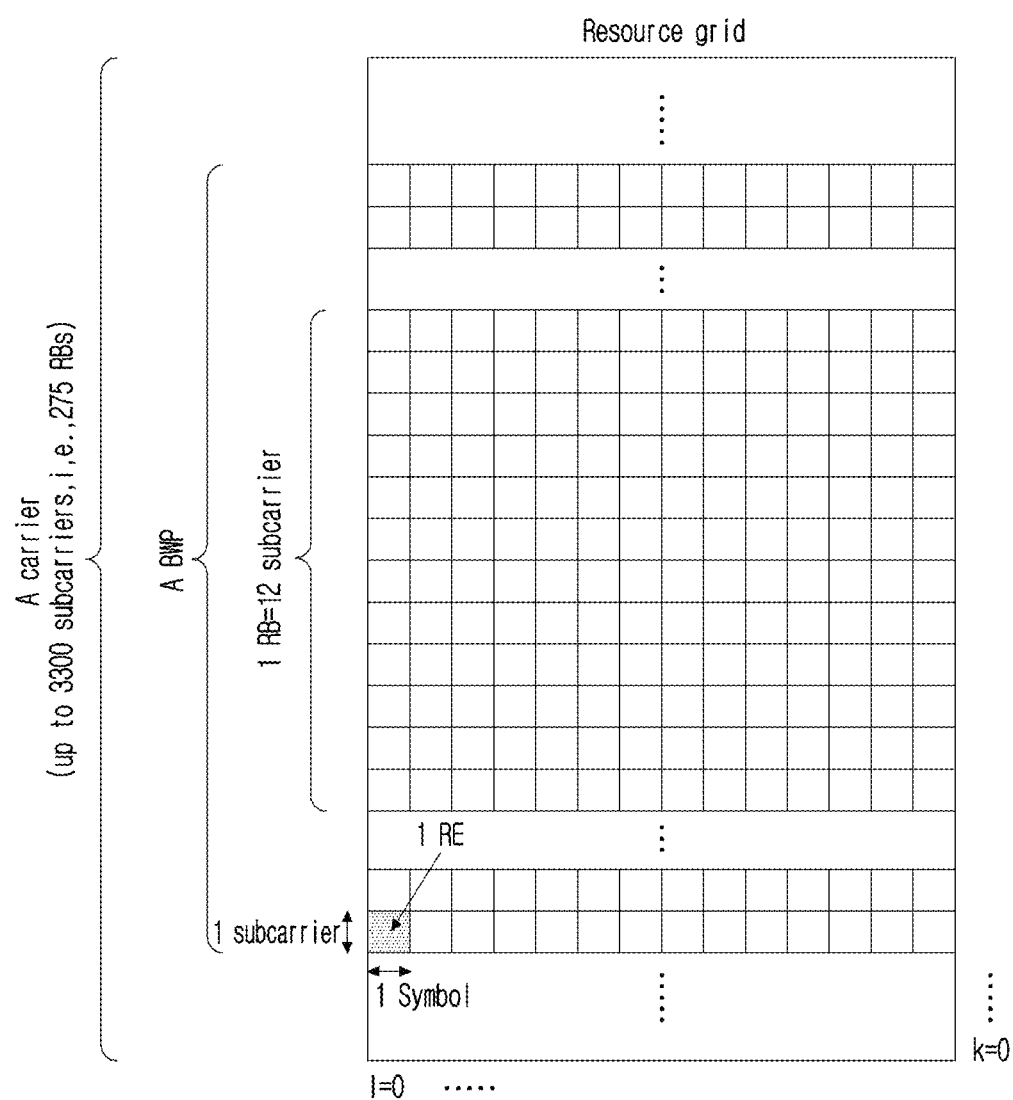
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP(Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE(Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
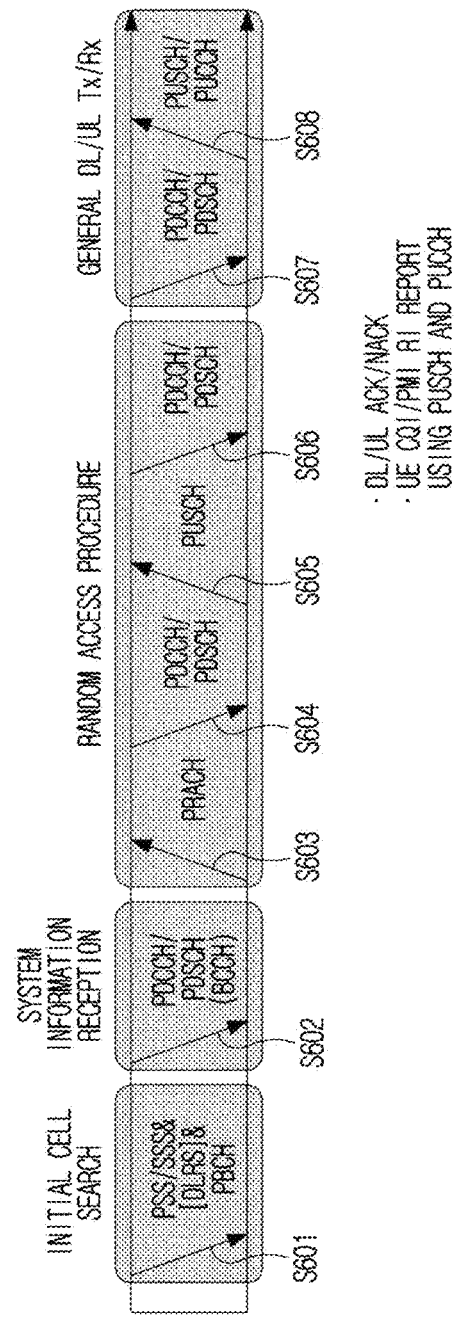
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH(Physical Uplink Shared Channel)/PUCCH(physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK(Acknowledgment/Non-Acknowledgment) signal, a CQI(Channel Quality Indicator), a PMI(Precoding Matrix Indicator), a RI(Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL(Supplementary UL), frequency resource allocation, time resource allocation, frequency hopping, etc.), information related to a transport block(TB) (e.g., MCS(Modulation Coding and Scheme), a NDI(New Data Indicator), a RV(Redundancy Version), etc.), information related to a HARQ(Hybrid-Automatic Repeat and request) (e.g., a process number, a DAI(Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined. DCI format 0_0 is used for scheduling of a PUSCH in one cell. Information included in DCI format 0_0 is CRC (cyclic redundancy check) scrambled by a C-RNTI(Cell Radio Network Temporary Identifier) or a CS-RNTI(Configured Scheduling RNTI) or a MCS-C-RNTI(Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI(Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB(virtual resource block)-PRB (physical resource block) mapping, etc.), information related to a transport block(TB)(e.g., MCS, NDI, RV, etc.), information related to a HARQ (e.g., a process number, DAI, PDSCH-HARQ feedback timing, etc.), information related to multiple antennas (e.g., an antenna port, a TCI(transmission configuration indicator), a SRS(sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Quasi-Co Location (QCL)

An antenna port is defined so that a channel where a symbol in an antenna port is transmitted can be inferred from a channel where other symbol in the same antenna port is transmitted. When a property of a channel where a symbol in one antenna port is carried may be inferred from a channel where a symbol in other antenna port is carried, it may be said that 2 antenna ports are in a QC/QCL(quasi co-located or quasi co-location) relationship.

Here, the channel property includes at least one of delay spread, doppler spread, frequency/doppler shift, average received power, received timing/average delay, or a spatial RX parameter. Here, a spatial Rx parameter means a spatial (Rx) channel property parameter such as an angle of arrival.

A terminal may be configured with a list of up to M TCI-State configurations in a higher layer parameter PDSCH-Config to decode a PDSCH according to a detected PDCCH having intended DCI for a corresponding terminal and a given serving cell. The M depends on UE capability.

Each TCI-State includes a parameter for configuring a quasi co-location relationship between ports of one or two DL reference signals and a DM-RS of a PDSCH.

A quasi co-location relationship is configured by a higher layer parameter qcl-Type1 for a first DL RS and qcl-Type2 for a second DL RS (if configured). For two DL RSs, a QCL type is not the same regardless of whether a reference is a same DL RS or a different DL RS.

A quasi co-location type corresponding to each DL RS is given by a higher layer parameter qcl-Type of QCL-Info and may take one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is a specific NZP CSI-RS, it may be indicated/configured that a corresponding NZP CSI-RS antenna port(s) is quasi-colocated with a specific TRS with regard to QCL-Type A and is quasi-colocated with a specific SSB with regard to QCL-Type D. A terminal received such indication/configuration may receive a corresponding NZP CSI-RS by using a doppler, delay value measured in a QCL-TypeA TRS and apply a Rx beam used for receiving QCL-TypeD SSB to reception of a corresponding NZP CSI-RS.

UE may receive an activation command by MAC CE signaling used to map up to 8 TCI states to a codepoint of a DCI field 'Transmission Configuration Indication'.

Transport Block (TB) Size Determination

When a higher layer parameter maxNrofCodeWordsScheduledByDCI indicates that two codeword transmissions are enable, if $I_{MCS}=1$ and $rv_{id}=1$ for a corresponding TB, one of two TBs is disabled by DCI format 1_1. If two TBs are enabled, TBs 1 and 2 are mapped to codewords 0 and 1, respectively. If only one TB is enabled, the enabled TB is always mapped to the first codeword.

For a PDSCH allocated by DCI format 1_0, format 1_1, or format 1_2 with CRC scrambled by a C-RNTI (Cell RNTI), an MCS-C-RNTI (Modulation Coding Scheme Cell RNTI), a TC-RNTI (Temporary Cell RNTI), a CS-RNTI (Configured Scheduling RNTI), or an SI-RNTI (System Information RNTI), a UE may first determine a TB size (TBS) as follows, except when a TB is disabled in DCI format 1_1.

1) A UE first determines the number of REs (NRE) in a slot.

A UE first determines the number of REs ($N'_{RE}$) allocated for a PDSCH in a physical resource block (PRB) by $N'_{RE}=N_{sc}^{RB} \cdot N_{symb}^{sh} - N_{DMRS}^{PRB} - N_{oh}^{PRB}$ (N'RE). Here, $N_{sc}^{RB}=12$ is the number of subcarriers in a PRB, $N_{symb}^{sh}$ is the number of allocated symbols for a PDSCH in a slot, $N_{DMRS}^{PRB}$ is the number of REs for a DM-RS per PRB in a scheduled duration including an overhead of DM-RS CDM groups without data as indicated by DCI format 1_1 or format 1_2 or as described by DCI format 1_0, and $N_{oh}^{PRB}$ is an overhead configured by the higher layer parameter xOverhead in PDSCH-ServingCellConfig. If xOverhead in PDSCH-ServingCellconfig is not configured (a value within 0, 6, 12, or 18), $N_{oh}^{PRB}$ is set to 0. When a PDSCH is scheduled by a PDCCH having a CRC scrambled by an SI-RNTI, an RA-RNTI (random access RNTI), an MsgB-RNTI, or a P-RNTI (paging RNTI), $N_{oh}^{PRB}$ is assumed to be 0.

A UE determines the total number of REs ($N_{RE}$) allocated for a PDSCH by $N_{RE}=\min(156, N'_{RE}) \cdot n_{PRB}$. Here, $n_{PRB}$ is the total number of PRBs allocated to a UE.

2) An Unquantized intermediate variable ($N_{info}$) is obtained by $N_{info}=N_{RE} \cdot R \cdot Q_m \cdot \upsilon$.

If $N_{info} \leq 3824$, use step 3 as the next step for TBS determination.

Otherwise, use step 4 as the next step for TBS determination.

3) If $N_{info} \leq 3824$, a TBS is determined as follows.

A quantized intermediate number of information bits $N'_{info}=\max(24, 2^n \cdot \text{floor}(N_{info}/2^n))$, where, $n=\max(3, \text{floor}(\log_2(N_{info}))-6)$.

Using Table 6 below, find the nearest TBS that is not less than $N'_{info}$.

Table 6 exemplifies a TBS in case of $N_{info} \leq 3824$.

TABLE 6

| Index | TBS | Index | TBS | Index | TBS | Index | TBS |
|---|---|---|---|---|---|---|---|
| 1 | 24 | 31 | 336 | 61 | 1288 | 91 | 3624 |
| 2 | 32 | 32 | 352 | 62 | 1320 | 92 | 3752 |
| 3 | 40 | 33 | 368 | 63 | 1352 | 93 | 3824 |
| 4 | 48 | 34 | 384 | 64 | 1416 | | |
| 5 | 56 | 35 | 408 | 65 | 1480 | | |
| 6 | 64 | 36 | 432 | 66 | 1544 | | |
| 7 | 72 | 37 | 456 | 67 | 1608 | | |
| 8 | 80 | 38 | 480 | 68 | 1672 | | |
| 9 | 88 | 39 | 504 | 69 | 1736 | | |
| 10 | 96 | 40 | 528 | 70 | 1800 | | |
| 11 | 104 | 41 | 552 | 71 | 1864 | | |
| 12 | 112 | 42 | 576 | 72 | 1928 | | |
| 13 | 120 | 43 | 608 | 73 | 2024 | | |
| 14 | 128 | 44 | 640 | 74 | 2088 | | |
| 15 | 136 | 45 | 672 | 75 | 2152 | | |
| 16 | 144 | 46 | 704 | 76 | 2216 | | |
| 17 | 152 | 47 | 736 | 77 | 2280 | | |
| 18 | 160 | 48 | 768 | 78 | 2408 | | |
| 19 | 168 | 49 | 808 | 79 | 2472 | | |
| 20 | 176 | 50 | 848 | 80 | 2536 | | |
| 21 | 184 | 51 | 888 | 81 | 2600 | | |
| 22 | 192 | 52 | 928 | 82 | 2664 | | |
| 23 | 208 | 53 | 984 | 83 | 2728 | | |
| 24 | 224 | 54 | 1032 | 84 | 2792 | | |
| 25 | 240 | 55 | 1064 | 85 | 2856 | | |
| 26 | 256 | 56 | 1128 | 86 | 2976 | | |
| 27 | 272 | 57 | 1160 | 87 | 3104 | | |
| 28 | 288 | 58 | 1192 | 88 | 3240 | | |
| 29 | 304 | 59 | 1224 | 89 | 3368 | | |
| 30 | 320 | 60 | 1256 | 90 | 3496 | | |

4) If $N_{info} > 3824$, a TBS is determined as follows.

A quantized intermediate number of information bits $N'_{info}=\max(3840, 2^n \times \text{round}((N_{info}-24)/2^n))$, where $n=\text{floor}(\log_2(N_{info}-24))-5$, and ties in the round function are broken towards the next largest integer (i.e., when the nearest number is two, the larger number is output).

if $R \leq 1/4$,

TBS$=8 \cdot C \cdot \text{ceiling}((N'_{info}+24)/(8 \cdot C))-24$, where $C=\text{ceiling}((N'_{info}+24)/3816)$, Otherwise, If $N'_{info} > 8424$, TBS$=8 \cdot C \cdot \text{ceiling}((N'_{info}+24)/(8 \cdot C))-24$, where $C=\text{ceiling}((N'_{info}+24)/8424)$, Otherwise, TBS$=8 \cdot \text{ceiling}((N'_{info}+24)/8)-24$ If $28 \leq I_{MCS} \leq 31$, It is assumed that a TBS is determined from DCI transmitted in the last PDCCH for the same TB using $0 \leq I_{MCS} \leq 27$. If there is no PDCCH for the same TB using $0 \leq I_{MCS} \leq 27$, and if the highest PDSCH for the same TB is semi-persistently scheduled, a TBS is determined from the most recent semi-persistent scheduling assignment PDCCH.

Otherwise,

It is assumed that a TBS is determined from DCI transmitted in the last PDCCH for the same TB using $0 \leq I_{MCS} \leq 28$. If there is no PDCCH for the same TB using $0 \leq I_{MCS} \leq 28$, and if the highest PDSCH for the same TB is semi-persistently scheduled, a TBS is determined from the most recent semi-persistent scheduling assignment PDCCH.

A UE does not expect to receive a PDSCH allocated by a PDCCH with a CRC scrambled by an SI-RNTI having a TBS greater than 2976 bits.

When two TCI states are indicated in a codepoint of the DCI field 'Transmission Configuration Indication', and when DM-RS port(s) in one CDM group is indicated in the DCI field "Antenna Port(s)", and when FDMSchemeB is configured for a UE, TBS determination follows steps 1 to 4 above with step 1 modified as follows: a UE determines the total number of REs ($N_{RE}$) allocated to a PDSCH by $N_{RE}=\min(156, N'_{RE}) \cdot n_{PRB}$, where $n_{PRB}$ is the total number of allocated PRBs corresponding to the first TCI state. And, the determined TBS of a PDSCH transmission occasion associated with the first TCI state is also applied to a PDSCH transmission occasion associated with the second TCI state.

When two TCI states are indicated in a codepoint of the DCI field 'Transmission Configuration Indication', and when DM-RS port(s) in one CDM group is indicated in the DCI field "Antenna Port(s)", and when TDMSchemeA is configured for a UE, TBS determination follows steps 1 to 4 above with step 1 modified as follows: a UE determines the number of REs ($N'_{RE}$) allocated for a PDSCH in a PRB by $N'_{RE}=N_{sc}^{RB} \cdot N_{symb}^{sh} - N_{DMRS}^{PRB} - N_{oh}^{PRB}$, where $N_{symb}^{sh}$ is the number of symbols of PDSCH allocation in a slot corresponding to the first TCI state. And, the determined TBS of a PDSCH transmission occasion associated with the first TCI state is also applied to a PDSCH transmission occasion associated with the second TCI state.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission(JT), coordinated Scheduling(CS), coordinated Beamforming (CB), dynamic Point Selection(DPS), dynamic Point Blocking(DPB), etc.

M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI(multiple DCI) that each TRP transmits different DCIs and ii) M-TRP transmission based on S-DCI(single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block(TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets(CORESETs)(or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

In addition, MTRP-URLLC may mean that a M TRPs transmit the same transport block(TB) by using different layer/time/frequency. A UE configured with a MTRP-URLLC transmission scheme receives an indication on multiple TCI state(s) through DCI and may assume that data received by using a QCL RS of each TCI state are the same TB. On the other hand, MTRP-eMBB may mean that M TRPs transmit different TBs by using different layer/time/frequency. A UE configured with a MTRP-eMBB transmission scheme receives an indication on multiple TCI state(s) through DCI and may assume that data received by using a QCL RS of each TCI state are different TBs. In this regard, as UE separately classifies and uses a RNTI configured for MTRP-URLLC and a RNTI configured for MTRP-eMBB, it may decide/determine whether the corresponding M-TRP transmission is URLLC transmission or eMBB transmission. In other words, when CRC masking of DCI received by UE is performed by using a RNTI configured for MTRP-URLLC, it may correspond to URLLC transmission, and when CRC masking of DCI is performed by using a RNTI configured for MTRP-eMBB, it may correspond to eMBB transmission.

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N(ACK/NACK), SR(scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N(process/retransmission) for PDSCH/PUSCH, etc. scheduled per each TRP/panel may be managed per corresponding CORESET group (i.e., per TRP/panel belonging to the same CORESET group).

For example, a higher layer parameter, ControlResourceSet information element (IE), is used to configure a time/frequency control resource set (CORESET). In an example, the control resource set (CORESET) may be related to detection and reception of downlink control information. The ControlResourceSet IE may include a CORESET-related ID (e.g., controlResourceSetID)/an index of a CORESET pool for a CORESET (e.g., CORESETPoolIndex)/a time/frequency resource configuration of a CORESET/TCI information related to a CORESET, etc. In an example, an index of a CORESET pool (e.g., CORESETPoolIndex) may be configured as 0 or 1. In the description, a CORESET group may correspond to a CORESET pool and a CORESET group ID may correspond to a CORESET pool index (e.g., CORESETPoolIndex).

NCJT(Non-coherent joint transmission) is a scheme in which a plurality of transmission points (TP) transmit data to one terminal by using the same time frequency resource, TPs transmit data by using a different DMRS(Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
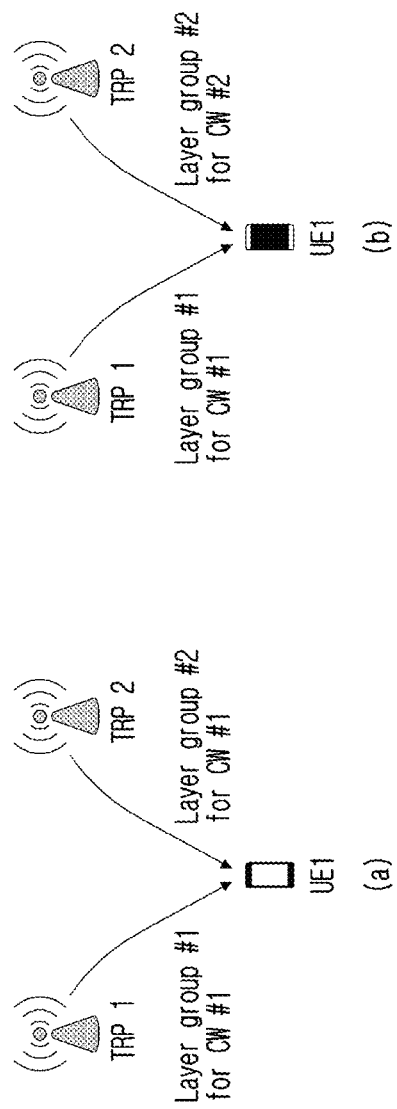
FIG. 7 illustrates a method of multiple TRPs transmission in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword(CW)/transport block(TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Signaling and Operation Method for High Speed Scenario (HST)-Single Frequency Network (SFN) Deployment In the process of 3GPP Release 13, RAN4 study item (SI) for the purpose of improving performance requirements in high speed scenario (HST) was approved, and the results of SI were summarized in TR 36.878. Among the results, TR 36.878 summarizes practical high speed scenarios from an operator for cellular service support, and among them, scenarios with higher priority in the future are as follows.

SFN (single frequency network) scenario: RRHs (remote radio heads) or RAUs (remote antenna units) are deployed through a fiber in a tunnel environment. RRHs or RAUs share the same cell identifier (ID). Repeaters are not mounted on a carriage.

A leaky cable in a tunnel (from a cracked cable to a repeater) scenario: Cracked cables are used to extend a signal through a tunnel environment. Repeaters are mounted on a carriage and distribute a signal within the carriage via cracked cables.

HST channel model was designed for analysis of high speed scenario, and among them, channel model for an SFN in particular is as follows.

A channel model designed for a single frequency network (SFN) scenario is a time-varying channel model of two taps, and characterized in that a Doppler shift, a tap delay, a relative power are given for each tap.

Figure 8:
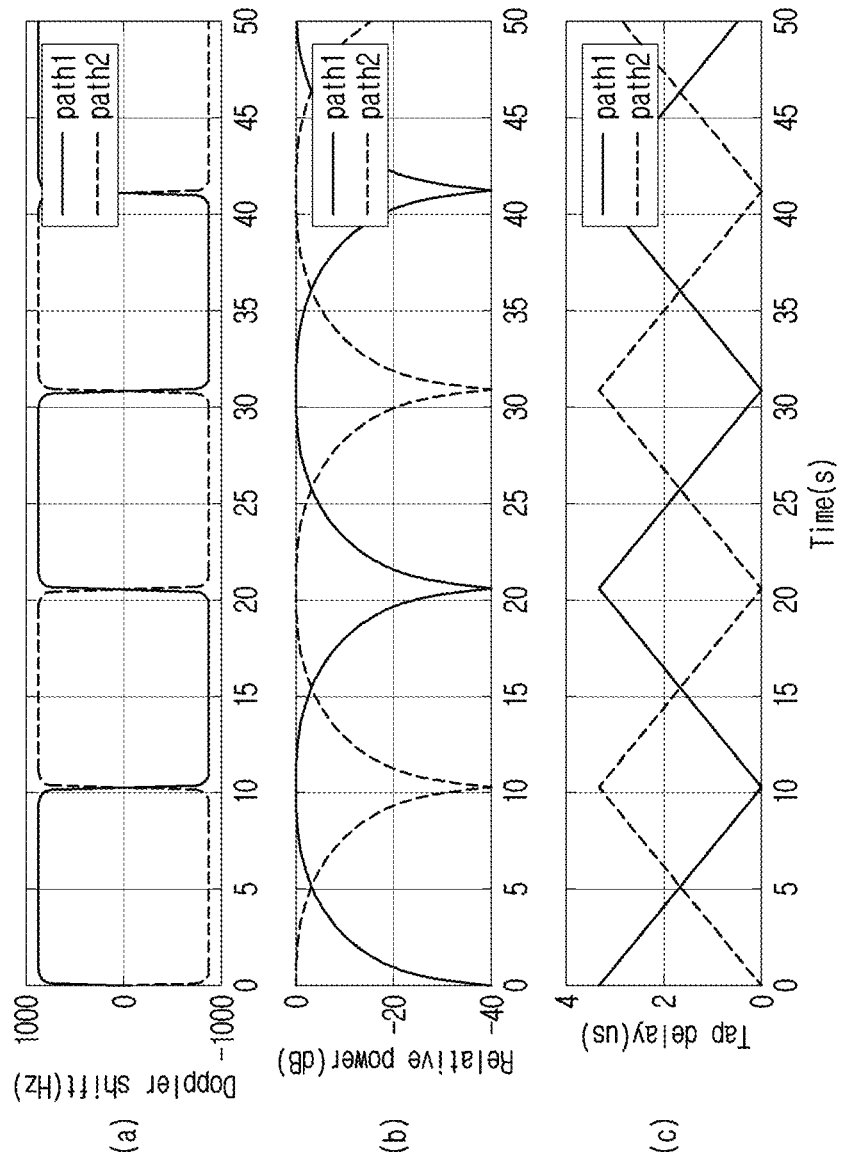
FIG. 8 is a diagram illustrating channel characteristics of an SFN channel model in a wireless communication system to which the present disclosure may be applied.

FIG. 8 is a diagram illustrating channel characteristics of an SFN channel model in a wireless communication system to which the present disclosure may be applied.

In case of the channel model of the HST-SFN deployment, channels from two different remote radio heads (RRHs) are defined as two different taps. And, each channel includes different Doppler shift, relative power, and tap delay values.

For a terminal, signals transmitted from different RRHs may be received in a combined form, and great performance degradation may occur in a specific duration due to channel characteristics. For example, when a terminal passes a midpoint between two RRHs, two channels have very similar sizes and have large Doppler shift values of different codes. In this case, if a terminal does not adequately compensate for different Doppler shifts, significant performance degradation may occur. In order to compensate for this problem, in the existing LTE system, a network informs a terminal that it is an SFN operation. In addition, after a terminal assumed that different Doppler shifts exist, different Doppler shift values could be estimated and compensated for. However, in this method, performance may vary greatly depending on the estimation capability/accuracy of a terminal capable of estimating a plurality of Doppler shift values from a combined signal. In addition, it may have a disadvantage in that complexity of a terminal increases for high performance. The present disclosure proposes a method capable of compensating for these disadvantages.

In the present disclosure, for convenience of description, it is assumed that two TRPs (e.g., TRP1/TRP2) operate. However, this assumption does not limit the technical scope of the present disclosure.

It is obvious that what has been described as a TRP in the present disclosure may be for convenience of description, which may also be interpreted in terms such as a panel/beam.

In this specification, L1 (layer 1) signaling may mean DCI-based dynamic signaling between a base station and a terminal, and L2 (layer 2) signaling may mean higher layer signaling based on RRC/MAC CE (control element) between a base station and a terminal.

Proposal #1: Method for configuring different QCL reference signals in the same DMRS port(s)

The current standard defines a higher layer parameter called 'TCI-State' for configuring a QCL reference signal (RS) of a PDSCH/PDCCH, and the definition of the TCI-State is shown in Table 7 below.

TABLE 7

ASNI START
TAG-TCI-STATE-START
TCI-State ::=            SEQUENCE{

TABLE 7-continued

```
    tci-StateId                     TCI-StateId,
    qcl-Type1                       QCL-Info,
    qcl-Type2                       QCL-Info
OPTIONAL,  -- Need R
...
QCL-Info ::=                        SEQUENCE {
    cell                            ServCellIndex
OPTIONAL,  -- Need R
    bwp-Id                          BWP-Id
OPTIONAL,  -- Cond CSI-RS-Indicated
    referenceSignal                 CHOICE {
        csi-rs                          NZP-CSI-RS-ResourceId,
        ssb                             SSB-Index
    },
    qcl-Type                        ENUMERATED {typeA, typeB, typeC,
typeD},
...
}
TAG-TCI-STATE-STOP
ASN1STOP
```

As can be seen in Table 7, one TCI-State may include a total of two QCL RS, such as qcl-Type1/qcl-Type2. Here, in the case of qcl-Type1, one type of TypeA/TypeB/TypeC may be configured, and in qcl-Type2, TypeD may be configured. Since TypeD means a RS for a reception beam of a terminal (i.e., Spatial Rx parameter), one of capable of acquiring channel information such as a Doppler shift/a Doppler spread/an average delay/a delay spread may be configured per TCI-State. Meanwhile, each code point in a 'TCI (Transmission configuration indication)' field for indicating a TCI state in DCI through the discussion of Rel-16 multi-TRP transmission has been improved to correspond to a single TCI state or two TCI states. The agreement below shows the content of these enhancements.

The TCI indication framework should be improved at least in Rel-16 for eMBB.

Each TCI code point in DCI may correspond to one or two TCI states.

When two TCI states are activated in one TCI code point, each TCI state corresponds to one CDM group for at least DMRS type 1.

In a TCI state configuration for one or two TCI states to be available per TCI code point, enhancement of MAC CE for mapping one or two TCI states for one TCI code point.

When two TCI states are indicated by a TCI code point, for DMRS type 1 and type 2 for eMBB, if the indicated DMRS ports are in two CDM groups, The first TCI state is applied to the first indicated CDM group, and the second TCI state is applied to the second indicated CDM group.

When two TCI states are indicated by one TCI code point, for DMRS type 1 and type 2 for eMBB and URLLC scheme-1a, if the indicated DMRS ports are in two CDM groups, the first TCI state corresponds to the CDM group of the first antenna port indicated by an antenna port indication table.

Hereinafter, a method of defining a TCI-state, which is a higher layer parameter and/or a method for improving performance in HST-SFN deployment based on a definition of a TCI field in DCI will be proposed.

Proposal A #1: When different (multiple) TCI states are indicated to a terminal through a TCI field in DCI, a terminal may assume that the indicated DMRS port(s) is configured with an SFN based on the plurality of TCI states, and may perform channel estimation/compensation based on QCL RSs corresponding to different TCI states.

In the case of Proposal A #1, different TCI states may be indicated for the same DMRS port(s). However, since a terminal may not be able to distinguish a multi-TRP transmission operation defined in Rel-16 and an SFN operation only by the above definition, based on additional conditions to be described later, a terminal can distinguish the Rel-16 multi-TRP transmission operation and the SFN operation.

Proposal A #1-1: A base station may configure whether to perform an SFN operation based on L2 signaling for a specific (or all or each) code point of a TCI field in DCI. Here, i) when different TCI states are indicated to a terminal through a specific code point of a TCI field in DCI, and ii) the specific (or all or each) code point is configured with an SFN, a terminal may assume that the indicated DMRS port(s) is configured with an SFN, and may perform channel estimation/compensation based on QCL RSs corresponding to different TCI states.

In the current standard, a 3-bit TCI field may be defined in DCI. In this case, whether to perform an SFN operation may be configured for a total of 8 codepoints defined as 3 bits. Table 8 below shows an example of a TCI field in which the proposed method is defined.

Table 8 exemplifies a TCI field in which whether to perform an SFN operation is configured.

TABLE 8

| Code point | TCI state | SFN |
| --- | --- | --- |
| 000 | {#1} | N/A |
| 001 | {#3} | N/A |
| 010 | {#1, #3} | on |
| 011 | {#2} | N/A |
| 100 | {#4} | N/A |
| 101 | {#2, #4} | off |
| 110 | {#5} | N/A |
| 111 | {#6} | N/A |

In Table 8, in the column of SFN, on indicates that an SFN operation is configured, and off indicates that an SFN operation is not configured.

In Table 8, it can be seen that two different TCI states are configured at two code points of 010 and 101. Here, in the case of 010, it shows that an SFN operation is configured, and in the case of 101, it shows that an SFN operation is not configured. Accordingly, when a code point corresponding to 010 is indicated to a terminal by a TCI field in DCI, a terminal may perform channel estimation/compensation based on QCL RSs of a TCI state corresponding to #1 and #3. In this case, a terminal ignores the Rel-16 multi-TRP transmission operation and may be defined to operate as an SFN. On the other hand, when a code point corresponding to 101 is indicated to a terminal by a TCI field in DCI, a terminal may perform PDSCH decoding based on the multi-TRP transmission operation defined in Rel-16.

In the present disclosure, an example of a method of performing channel estimation/compensation based on QCL RSs of different TCI states, assuming that a terminal has configured an SFN operation, is as follows. A terminal may continuously track channel information such as a Doppler shift/a Doppler spread/an average delay/a delay spread for each QCL RS in different TCI states. Therefore, when a terminal assumes that an SFN operation is configured for the same DMRS port(s) and multiple TCI states are indicated, a terminal may perform channel compensation on an assumption that there are two different taps based on a channel value corresponding to a QCL RS of each TCI state. For details, refer to the method described in section 6.4.3.1 of TR 36.878. In this way, when a base station indicates whether to operate an SFN and a plurality of QCL RSs for the same DMRS port(s), since a terminal can estimate each channel value from RSs separated from each other without estimating different channel values (e.g., Doppler shift) from a combined received signal, it is possible to reduce the complexity of a terminal and also to increase the estimation performance for a channel corresponding to each RRH. Hereinafter, even if there is no separate description in the present disclosure, a channel estimation/compensation method for DMRS port(s) configured with an SFN may follow the above-described method.

Proposal A #1-1-1: A base station may configure whether to perform an SFN operation for a specific (or all or each) code point of a TCI field in DCI. Here, different TCI states may be indicated through a specific code point of a TCI field in DCI. In the case of a terminal in which a specific code point is configured with an SFN, whether an actual SFN operation may be determined based on the number of CDM groups including DMRS port(s) indicated through DCI and/or a QCL type configured in TCI states indicated through a specific code point.

In addition to the above proposal A #1-1, additional operating conditions may be considered. This method may be applied to dynamically indicate a specific transmission scheme with respect to different transmission schemes.

Figure 9:
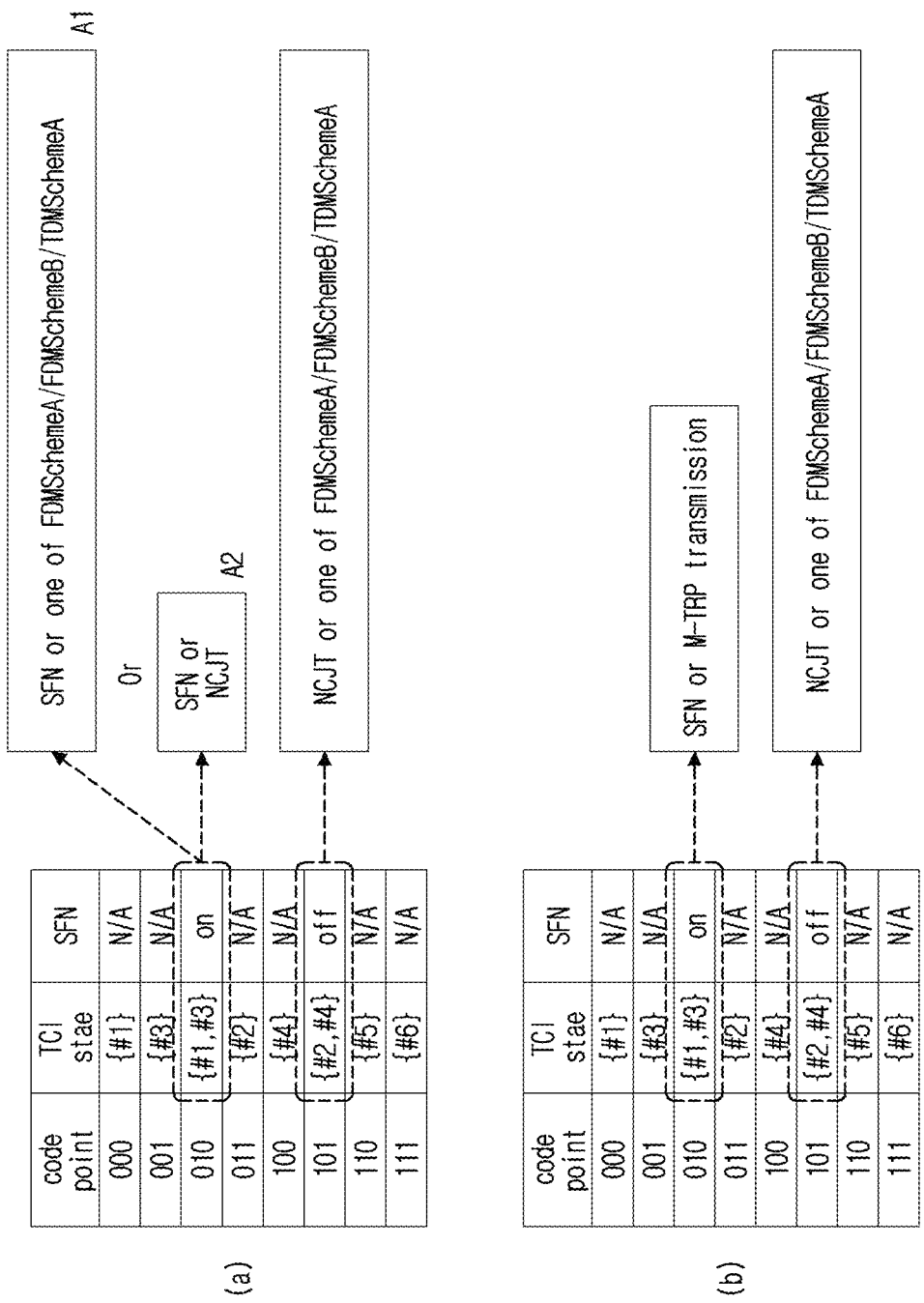
FIG. 9 illustrates a method of configuring whether to operate an SFN according to an embodiment of the present disclosure.

FIG. 9 illustrates a method of configuring whether to operate an SFN according to an embodiment of the present disclosure.

Referring to FIG. 9(a), in the case of 101 code point, it can be seen as an example of multi-TRP transmission (defined in Rel-16). In this case, when DMRS port(s) indicated through DCI are included in different CDM groups, it may be interpreted as NCJT transmission. On the other hand, when DMRS port(s) indicated through DCI are included in the same CDM group, it may be interpreted as one transmission method among FDMSchemeA/FDMSchemeB/TDMSchemeA. Meanwhile, 010 code point may be an example of the proposed method of the present disclosure.

In the case of A1 in FIG. 9(a), when DMRS port(s) indicated through DCI are included in different CDM groups, it is interpreted as an SFN, and when included in the same CDM group, it may be an example of interpretation as one transmission method among FDMSchemeA/FDMSchemeB/TDMSchemeA. On the other hand, in the case of A2 in FIG. 9(a), when DMRS port(s) indicated through DCI are included in different CDM groups, it may be interpreted as NCJT, and when included in the same CDM group, it may be interpreted as an SFN.

FIG. 9(b) shows an example in which whether an actual SFN operation is determined based on a QCL type configured in TCI states.

In the case of 010 code point in FIG. 9(b), it may be an example of the proposed method. Here, when types of QCL RSs indicated in TCI states #1 and #3 are different from each other (e.g., a type of one QCL RS is TypeA and a type of the other QCL RS is TypeC), it may be interpreted as an SFN operation. On the other hand, when types of QCL RSs are the same (e.g., all QCL RS types are TypeA), it may be interpreted as a (Rel-16) multi-TRP transmission operation. Alternatively, the reverse may also be possible.

In the above description, different QCL types may mean a case in which QCL types other than TypeD are different for QCL RSs included in different TCI states. This is equivalently applicable even if not separately described in the following description of the present disclosure.

Proposal A #1-2: A base station may configure whether to perform an SFN operation to a terminal based on L2 signaling. Here, in the case of a terminal in which i) an SFN operation is configured and ii) different TCI states are indicated through a specific code point of a TCI field in DCI, whether an actual SFN operation may be determined based on the number of CDM groups including DMRS port(s) indicated through DCI and/or a QCL type configured in TCI states indicated through the specific code point. For example, when DMRS port(s) is included in a single CDM group, it may be defined to assume an SFN operation. And/or, when QCL types configured in TCI states indicated through the specific code point are different from each other (e.g., TypeA for TCI state 1, TypeC for TCI state 2), it may be defined to assume an SFN operation.

In the method, after an SFN operation is possible through L2 signaling is configured, if an additional condition is satisfied, an actual SFN operation may be performed. Accordingly, when a plurality of TCI states are indicated, a specific method among a plurality of possible transmission methods may be dynamically indicated.

FIG. 10 illustrates a method of configuring whether to operate an SFN according to an embodiment of the present disclosure.

In the case of FIG. 10(a), it may be configured that an SFN operation is possible through L2 signaling together with the (Rel-16) multi-TRP transmission method. After the configuration, when DMRS port(s) indicated through DCI are included in different CDM groups, it may be interpreted as an SFN operation. In this case, it may have a disadvantage that it is impossible to dynamically select between NCJT and an SFN is not possible.

In the case of FIG. 10(b), in addition to the (Rel-16) multi-TRP transmission method, one method of an SFN operation and a URLLC operation may be configured through L2 signaling. After the configuration, when DMRS port(s) indicated through DCI are included in the same CDM group, it may be interpreted as an SFN operation. In this case, it may have a disadvantage that it is impossible to dynamically select between a URLLC transmission method and an SFN.

In the case of FIG. 10(c), it may be configured that an SFN operation is possible through L2 signaling together with the (Rel-16) multi-TRP transmission method. After the configuration, when multiple TCI states are indicated through DCI and QCL types of different TCI states are different, it may be interpreted as an SFN operation.

For example, whether to configure/operate an SFN in the above-mentioned proposal A #1-1-1/A #1-2 may be determined based on L2 signaling and a DCI field (e.g., TCI field). Alternatively, a configuration based on a DCI field (e.g., TCI field) with respect to whether to configure/operate an SFN may have priority over a configuration based on L2 signaling.

Whether to configure/operate an SFN based on a specific RNTI value together with the above-mentioned proposal A #1/A #1-1/A #1-1-1/A #1-2 may be indicated to a terminal. Alternatively, whether to configure/operate an SFN may be indicated to a terminal based on a specific RNTI value without application of the aforementioned proposal A #1/A #1-1-/A #1-1-1/A #1-2. For example, an RNTI value within a specific range may be defined as an SFN-RNTI. And, when a PDCCH is transmitted based on an SFN-RNTI configured to a terminal (that is, when a CRC of DCI transmitted through a PDCCH is scrambled based on an SFN-RNTI), a terminal may assume that a PDSCH scheduled through the PDCCH is transmitted based to an SFN operation.

The above-mentioned proposal A #1/A #1-1/A #1-1-1/A #1-2 proposes a different QCL RS configuration method for data (e.g., PDSCH) transmission. In addition, different QCL RS configuration methods for control data (e.g., PDCCH) transmission may be considered. This is because a PDCCH can also be SFNed, and in the current standard, it is defined so that a QCL RS of a PDCCH can be referred to for a QCL RS for a PDSCH. For example, when there is no TCI field in DCI and a scheduling offset between DCI and a PDSCH is greater than a threshold value, it is defined to apply a TCI state of a PDCCH to the PDSCH.

The following proposal proposes a different QCL RS configuration method for control data (e.g., PDCCH) transmission.

Proposal A #2: A base station may configured different TCI states for PDCCH DMRS port(s) to a terminal based on L2 signaling. When different TCI states are configured, a terminal may assume that PDCCH DMRS port(s) is configured with an SFN, and may perform channel estimation/compensation based on QCL RSs corresponding to different TCI states.

Table 9 exemplifies a higher layer parameter (i.e., CORESET information element (IE)) for a CORESET to which a PDCCH is to be transmitted (used for monitoring of a PDCCH). That is, Table 9 is an example of configuration information related to a CORESET. A terminal may receive a PDCCH within the configured CORESET. In other words, Table 9 below is an example of configuration information for a CORESET used by a terminal to receive (or monitor) a PDCCH.

TABLE 9

```
ASN1 START
TAG-CONTROLRESOURCESET-START
ControlResourceSet ::=                              SEQUENCE {
    controlResourceSetId                                ControlResourceSetId,
    frequencyDomainResources                            BIT STRING (SIZE (45)),
    duration                                            INTEGER (E.maxCoReSetDuration),
    cce-REG-MappingType                                 CHOICE {
        interleaved                                         SEQUENCE{
            reg-BundleSize                                      ENUMERATED {n2, n3, n6},
            interleaverSize                                     ENUMERATED {n2, n3,n6},
            shiftIndex
INTEGER(0..maxNrofPhysicalResourceBlocks-1)             OPTIONAL -- Need S
        },
        nonInterleaved                                  NULL
    },
    precoderGranularity                             ENUMERATED {sameAsREG-bundle,
allContiguousRBs},
    tci-StatesPDCCH-ToAddList                           SEQUENCE(SIZE (L.maxNrofTCI-
StatesPDCCH)) OF TCI-StateId OPTIONAL,          -- CondNotSIB1-initialBWP
    tci-StatesPDCCH-ToReleaseList                   SEQUENCE(SIZE (1..maxNrofTCI-
StatesPDCCH)) OF TCI-StateId OPTIONAL,          -- CondNotSIB1-initialBWP
    tci-PresentInDCI                                    ENUMERATED {enabled}
OPTIONAL, -- Need S
    pdcch-DMRS-ScramblingID                             INTEGER (0..65535)
OPTIONAL, -- Need S
    ...
}
TAG-CONTROLRESOURCESET-STOP
ASN1STOP
```

Table 10 below is a table describing fields in CORESET IE.

TABLE 10

CORESET IE fields description cce-REG-MappingType
Mapping of control channel elements (CCEs) to resource element groups (REGs)
controlResourceSetId
A value of 0 identifies a common CORESET (CORESET0, controlResourceSetZero)
configured in a serving cell common configuration (ServingCellConfigCommon) and also in
an MIB (master information block), and is not used here in the CORESET IE. Values of 1 to
maxNrofControlResourceSets-1 identify CORESETs configured by dedicated signaling or TABLE 10-continued CORESET IE fields description system information block 1 (SIB1). controlResourceSetId is unique among BWPs of a serving cell.
duration
Contiguous time duration of a CORESET in number of symbols
frequency DomainResources
Frequency domain resources for a CORESET. Each bit corresponds a group of 6 RBs, with grouping starting from the first RB group in a BWP. The first (left-most/most significant) bit corresponds to the first RB group in a BWP, and so on. A bit that is set to 1 indicates that this RB group belongs to a frequency domain resource of this CORESET. Bits corresponding to a group of RBs not fully contained in the bandwidth part within which a CORESET is configured are set to zero
interleaverSize
Interleaver-size
pdcch-DMRS-ScramblingID
PDCCH DMRS scrambling initialization. When the field is absent a UE applies a value of the physCellId configured for this serving cell.
precoderGranularity
Precoder granularity in frequency domain
reg-BundleSize
Resource Element Groups (REGs) can be bundled to create REG bundles. This parameter defines a size of such bundles.
shiftIndex
When this field is absent, a UE applies a value of the physCellIdconfigured for this serving cell.
tci-PresentInDCI
This field indicates if TCI (transmission configuration indicator) field is present or absent in DCI. When this field is absent, a UE considers the TCI to be absent/disabled. In case of cross carrier scheduling, a network sets this field to enabled for a CORESET used for cross carrier scheduling in the scheduling cell.
tci-StatesPDCCH-ToAddList
A subset of TCI states defined in a PDSCH configuration (pdsch-Config) included in a downlink dedecated BWP (BWP-DownlinkDedicated) corresponding to a serving cell and to a DL BWP to which a CORESET belong to. They are used for providing QCL relationships between DL RS(s) in one RS Set (TCI-State) and PDCCH DMRS ports. Anetwork configures entries of the maximum number of PDCCH TCI states (maxNrofTCI-StatesPDCCH).
NotSIB1-initialBWP
This field is a field with conditional presence. When SIB1 is broadcast, this field is not in the PDCCH common configuration (PDCCH-ConfigCommon) of the first BWP in SIB1 and the serving cell common configuration (ServingCellConfigCommon). Otherwise, it is optionally present.

Figure 11:
FIG. 11 illustrates a MAC control element (CE) for configuring a specific TCI state in a CORESET in a wireless communication system to which the present disclosure may be applied.

FIG. 11 illustrates a MAC control element (CE) for configuring a specific TCI state in a CORESET in a wireless communication system to which the present disclosure may be applied. As shown in Tables 9 and 10 above, candidate TCI states of a specific CORESET may be configured through a higher layer parameter (i.e., tci-StatesPDCCH-ToAddList). That is, configuration information related to a CORESET may include information on one or more TCI states. And, as shown in FIG. 11, a specific TCI state to be actually applied to a corresponding CORESET may be configured through a MAC CE operation.

According to the existing standard, one TCI state may be configured in a specific CORESET through a MAC CE operation.

Meanwhile, performance for an HST-SFN can be improved by informing different QCL RSs for the same DMRS port(s) as in the above proposal A #1/A #1-1/A #1-1-1/A #1-2. In addition, it can also have an advantage of reducing an RS overhead to reduce an RS configured with an SFN. However, in order to reduce an RS configured with an SFN, it is necessary to define a method in which a PDCCH can also refer to different QCL RSs in the same way as a PDSCH. Otherwise, according to the current standard scheme described above, since only one QCL RS can be referenced, there may be a problem in that an RS configured with an SFN needs to be additionally defined for PDCCH transmission.

To solve this problem, the above proposal A #2 may be applied. That is, a base station may configure different TCI states for PDCCH DMRS port(s) to a terminal based on L2 signaling. And, when different TCI states are configured in PDCCH DMRS port(s), assuming that PDCCH DMRS port(s) is configured with an SFN (or whether to perform an SFN operation may be explicitly indicated/configured by a base station), a terminal may perform channel estimation/compensation based on QCL RSs corresponding to different TCI states.

Hereinafter, specific examples for supporting the proposal A #2 will be described.

Meanwhile, in order to transmit a PDCCH having higher reliability/robustness, a resource region for transmitting a plurality of PDCCHs corresponding to the same DCI may be defined. Specifically, when multi-TRP transmission is assumed, a resource region for transmitting a PDCCH corresponding to each TRP may be defined. In addition, each TRP may transmit a PDCCH carrying the same DCI in the defined resource region.

In the present disclosure, such a resource region is referred to as a monitoring location (ML). In the present disclosure, the ML may be interpreted as a PDCCH transmission region in which the same DCI may be transmitted based on repetition/fraction. Here, the MLs may correspond to different QCL RS(s) (/TCI state(s)), respectively.

When a plurality of PDCCHs are transmitted through different MLs, a repetition transmission method in which each PDCCH corresponds to the same DCI may be applied, and/or a (fraction) method in which each PDCCH is transmitted by dividing one DCI information may be applied. The repetition and fraction methods described above are as follows.

Repetition: For different MLs (e.g., ML1/ML2), based on a PDCCH transmission resource in each ML (which may be based on the same or different MLs) and the same DCI, after channel coding, each (or the same) encoded bits may be transmitted in each ML.

For example, after generating encoded bits based on a PDCCH transmission resource in ML1 (e.g., PDCCH candidate #x in an aggregation level (AL) #y) and DCI1, the corresponding bits may be transmitted in the PDCCH transmission resource in ML1. After generating encoded bits based on a PDCCH transmission resource in ML2 (or may be based on the PDCCH transmission resource in ML1) and DCI1 (meaning the same DCI as above), the corresponding bits may be transmitted in the PDCCH transmission resource in ML2.

Fraction: For different MLs (e.g., ML1/ML2), based on a single DCI and multiple PDCCH transmission resources in different MLs, after channel coding, some of encoded bits may be transmitted through ML1 and the remaining part may be transmitted through ML2.

For example, a PDCCH transmission resource in ML1 (e.g., PDCCH candidate #x in AL #y) and a PDCCH transmission resource in ML2 (e.g., PDCCH candidate #x' in AL #y') may be assumed as an entire transmission resource. And, after generating encoded bits based on the entire transmission resource and DCI1, some of the corresponding bits may be transmitted through ML1, and the remaining part may be transmitted through ML2.

As another example, after generating encoded bits based on a PDCCH transmission resource in a specific ML (e.g., PDCCH candidate #x in AL #y in ML1) among a plurality of MLs and DCI1, some of the corresponding bits may be transmitted through ML1, and some of the remaining bits may be transmitted through ML2. Here, for single encoded bits, transmission for each ML may be performed through rate matching based on repeated transmission in a circular buffer.

As described above, when defining a plurality of MLs performing repetition/fraction transmission, when multi-TRP transmission is considered, different MLs may correspond to different TRPs, respectively. In this case, each ML may correspond to different QCL RS(s) (/TCI state(s)). To this end, a method for configuring a plurality of QCL RS(s) (/TCI state(s)) to the same PDCCH DMRS port(s) proposed in the present specification (Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4) may be applied. When applying the proposed methods, a base station may inform a terminal for what purpose it will be used by configuring/indicating whether to perform an SFN operation and/or whether multiple MLs are defined together. That is, a plurality of QCL RS(s) (/TCI state(s)) may be configured in the same way, and by additionally configuring/indicating a terminal for what purpose it will be used, a terminal operates based on an SFN, or based on a plurality of ML. Alternatively, an independent configuration method may be defined according to each use.

In the present disclosure, for convenience of description, two MLs (e.g., ML1/ML2) are described mainly in an example in which they are configured/defined, but do not limit the technical scope of the present disclosure, and it can be applied even when a plurality of MLs of two or more are configured/defined.

Meanwhile, in the following proposal, for convenience of description, it is assumed that a plurality of MLs can be defined through a single search space set (SS) configuration and a single CORESET configuration, but the technical scope of the present disclosure is not limited thereto. Even when multiple MLs are defined through single/multiple SS configuration(s) and single/multiple CORESET configuration(s), the proposed methods can also be applied.

Figure 12:
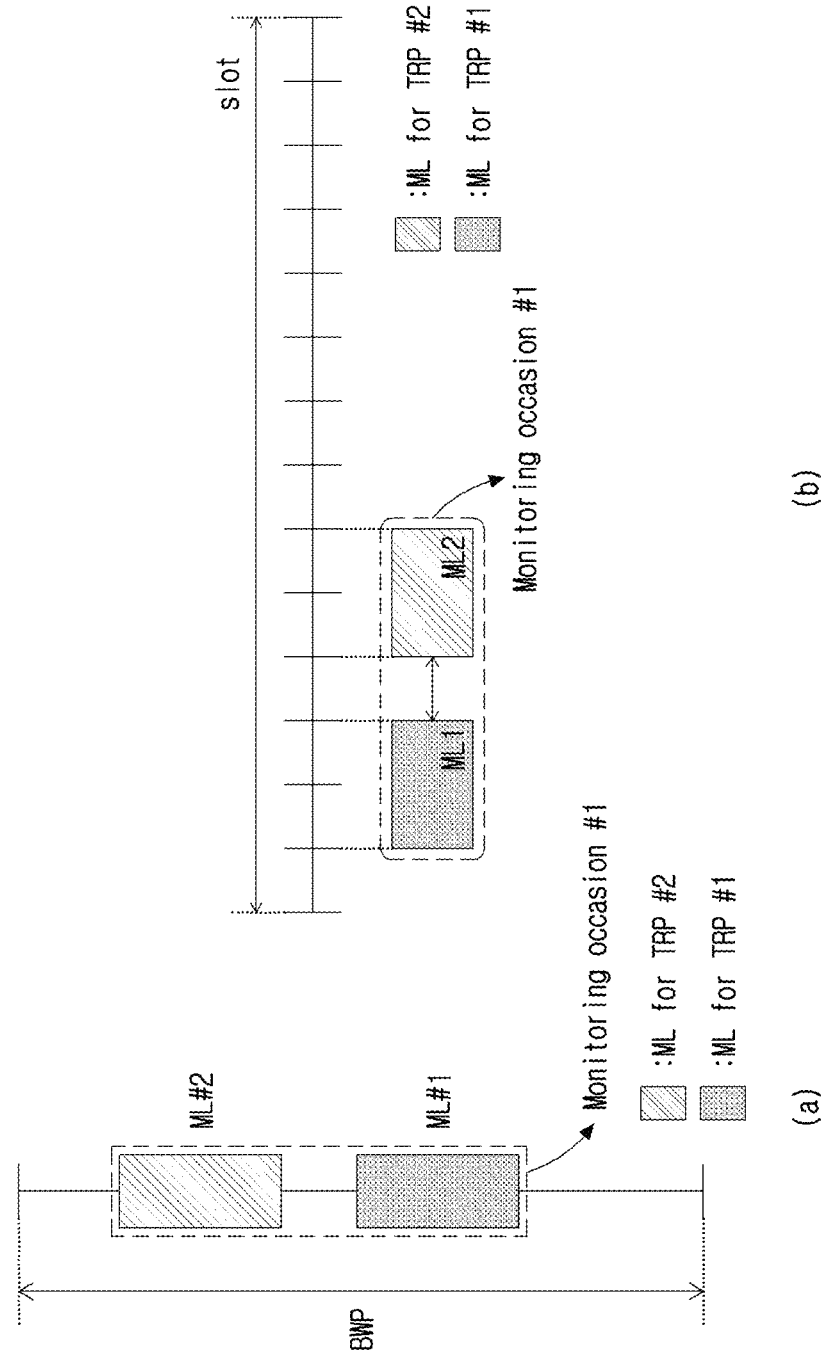
FIG. 12 illustrates a method defined in different MLs according to an embodiment of the present disclosure.

FIG. 12 illustrates a method defined in different MLs according to an embodiment of the present disclosure.

FIG. 12(*a*) exemplifies that different MLs are defined in a frequency domain (for the same monitoring occasion), and FIG. 12(*b*) exemplifies that different MLs are defined in a time domain (for the same monitoring occasion).

In FIG. 12, it is assumed that a plurality of MLs configure the same monitoring occasion (MO) for convenience of description, but the operation is not limited thereto. That is, multiple MLs may correspond to multiple MOs. In the example of FIG. 12, different MLs may be resources corresponding to different CORESET configurations, and/or may be multiple MLs defined through the same CORESET configuration.

Hereinafter, the present disclosure proposes a method of configuring/indicating different TCI states (/QCL RS(s)) for a plurality of MLs defined to perform repetition/fraction transmission (for the same DCI).

Proposal A #2-1: A method of introducing a new MAC CE operation to configure different QCL RSs that are configured with an SFN operation for the same PDCCH DMRS port(s)

Proposal A #2-1-1: A base station may configure a plurality of TCI states in a specific CORESET through a signaling operation of a MAC CE.

Figure 13:
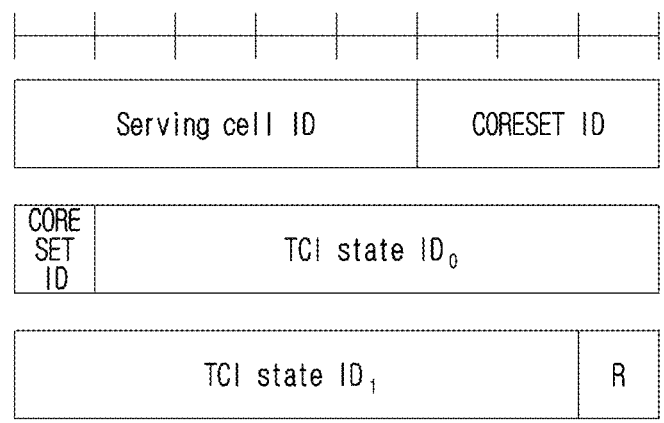
FIG. 13 illustrates a MAC control element for indicating a plurality of TCI states according to an embodiment of the present disclosure.

FIG. 13 illustrates a MAC control element for indicating a plurality of TCI states according to an embodiment of the present disclosure.

In FIG. 13, the serving cell ID indicates an identifier of a serving cell to which a corresponding MAC CE is applied. The CORESET ID indicates a control resource set to which a TCI state is indicated. The TCI state ID indicates a TCI state that can be applied to a control resource set identified by the CORESET ID field. The R may mean a reserved bit.

Referring to FIG. 13, different QCL RSs may be configured for one CORESET through a TCI state ID field (e.g., TCI state ID0, TCI state ID1).

That is, according to the proposed method of the present disclosure, a plurality of TCI states may be configured for one CORESET through the MAC CE of FIG. 13. Here, M (M is a natural number) TCI states indicated by the MAC CE may be determined in N (M≤N, N is a natural number) TCI states configured in CORESET-related configuration information (e.g., see Tables 9 and 10).

Here, the MAC CE operation may be applied together with the existing Rel-15/16 MAC CE operation. That is, in the case of a terminal receiving the existing MAC CE message including one TCI state ID, it may be assumed that one TCI state is configured in a CORESET. In addition, in the case of a terminal receiving a MAC CE message including a plurality of TCI state IDs as in the proposed method, it may be assumed that a PDCCH DMRS transmitted in a CORESET is transmitted through an SFN.

The above proposal may be applied when a PDCCH DMRS is transmitted through an SFN and/or when the same DCI is transmitted through repetition/fraction through multiple MLs. When the above proposal is applied when the same DCI is transmitted through a plurality of MLs through repetition/fraction, different QCL RS(s) (/TCI state(s)) may correspond to different MLs, respectively. For example, the TCI state IDO and TCI state ID1 may sequentially correspond to ML1/2, respectively.

Proposal A #2-1-2: A base station may perform activation/deactivation for an additional TCI state for a specific CORESET through a MAC CE operation.

Figure 14:
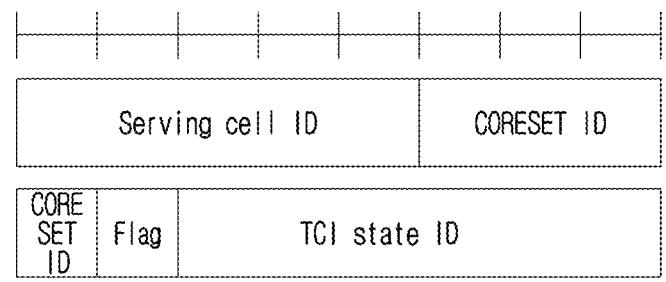
FIG. 14 illustrates a MAC control element for indicating activation/deactivation for an additional TCI state according to an embodiment of the present disclosure.

FIG. 14 illustrates a MAC control element for indicating activation/deactivation for an additional TCI state according to an embodiment of the present disclosure.

In FIG. 14, the serving cell ID indicates an identifier of a serving cell to which a corresponding MAC CE is applied. The CORESET ID indicates a control resource set to which a TCI state is indicated. The TCI state ID indicates a TCI state that can be applied to a control resource set identified by the CORESET ID field.

In addition, as in the example of FIG. 14, a field that can inform whether a MAC CE message is for activation or deactivation of an additional TCI state may be defined. For example, in FIG. 14, a flag may be used to indicate whether the MAC CE message is for activation or deactivation.

A terminal may be configured with a TCI state for a specific CORESET through the Rel-15/16 MAC CE message (e.g., MAC CE of FIG. 11), and may be configured with additional TCI state through the MAC CE message of FIG. 14. When an additional TCI state is configured according to the proposed method, a terminal may assume that a PDCCH DMRS transmitted in a CORESET is transmitted through an SFN. A base station may change an SFN operation to a non-SFN operation by deactivating the TCI state through the MAC CE of FIG. 14.

That is, according to the proposed method of the present disclosure, a plurality of TCI states may be configured for one CORESET through the MAC CE of FIG. 14. A TCI state for a specific CORESET is configured through the Rel-15/16 MAC CE message (e.g., MAC CE of FIG. 11), and one or more TCI states for the corresponding CORESET may be additionally configured through the MAC CE of FIG. 14. Here, M (M is a natural number) TCI states indicated by the MAC CE of FIG. 14 may be determined in N (M≤N, N is a natural number) TCI states configured in CORESET-related configuration information (e.g., see Tables 9 and 10).

The above proposal may be applied when a PDCCH DMRS is transmitted through an SFN and/or when the same DCI is transmitted through repetition/fraction through multiple MLs. When the above proposal is applied when the same DCI repetition/fraction is transmitted through a plurality of MLs, different QCL RS(s) (/TCI state(s)) may correspond to different MLs. For example, a TCI state (e.g., TCI state 0) of a CORESET configuration defined based on the Rel-15 operation and a (additional) TCI state (e.g., TCI state 1) defined based on the proposed method may sequentially correspond to ML1/2, respectively.

Proposal A #2-2: In order to configure different QCL RSs that are SFNed for the same PDCCH DMRS port(s), a new interpretation method for the existing MAC CE operation Proposal A #2-2-1: A base station may configure information on candidates of a TCI state combination that can be composed of a plurality of TCI states in a CORESET configuration (e.g., by higher layer signaling), a specific combination among the candidates of a TCI state combination may be configured in a CORESET. In this case, the TCI state ID defined in a MAC CE may mean/indicate an index for a combination of the candidate TCI state (or may be interpreted as an index).

TABLE 11

| TCI state combination ID(or index) | TCI state $ID_0$ | TCI state $ID_1$ |
|---|---|---|
| #1 | #1 | |
| #2 | #2 | |
| #3 | #3 | |
| #4 | #1 | #2 |
| #5 | #2 | #3 |
| #6 | #4 | |
| #7 | #5 | |
| #8 | #4 | #5 |

As in the example of Table 11, each TCI state combination may include one or multiple TCI states. When information on a TCI state combination as described above is configuration in a CORESET configuration (e.g., see Tables 9 and 10 above), the field indicating the TCI state ID in the MAC CE message (e.g., see FIG. 11 above) may be interpreted for the purpose of indicating a TCI state combination ID (or index). For example, when a TCI state combination ID composed of a plurality of TCI states is configured as shown in #4/#5/#8 of Table 11, a terminal may assume that a PDCCH DMRS transmitted from a CORESET is transmitted through an SFN.

That is, according to the proposed method of the present disclosure, a plurality of TCI states may be configured for one CORESET through a MAC CE. A plurality of TCI states for the CORESET may be configured by indicating a TCI state combination identifier for a specific CORESET through a specific MAC CE message. Here, a TCI state combination identifier indicated by a specific MAC CE may be determined in TCI state combination candidates configured in CORESET-related configuration information (e.g., see Tables 9 and 10).

The above proposal may be applied when a PDCCH DMRS is transmitted through an SFN and/or when the same DCI is transmitted through repetition/fraction through multiple MLs. When the above proposal is applied when the same DCI repetition/fraction is transmitted through a plurality of MLs, different QCL RS(s) (/TCI state(s)) may correspond to different MLs. For example, when a TCI state combination ID composed of a plurality of TCI states is configured, such as #4/#5/#8, the first/second TCI states may sequentially correspond to ML1/2, respectively. In other words, in Table 11, TCI state ID0 may correspond to ML1, and TCI state ID1 may correspond to ML2, respectively.

Proposal A #2-3: A method of using higher layer signaling (e.g., RRC signaling) to configure different QCL RSs that are SFNed for the same PDCCH DMRS port(s)

Proposal A #2-3-1: A base station may configure a TCI state combination that can be configured with a plurality of TCI states in a CORESET configuration.

That is, according to the proposed method of the present disclosure, a plurality of TCI states may be configured for one CORESET through CORESET configuration information (e.g., see Tables 9 and 10).

According to the current standard, RRC signaling and a MAC CE operation should be accompanied together to configure a TCI state of a CORESET. In this proposal, based on RRC signaling, a plurality of TCI states may be configured for a corresponding CORESET. When the above method is applied, a new MAC CE message/operation is not required, so it can have an advantage that the influence of the existing operation according to the standard can be reduced. The above proposal may be applied when a PDCCH DMRS is transmitted through an SFN and/or when the same DCI is transmitted through repetition/fraction through multiple MLs. When the above proposal is applied when the same DCI repetition/fraction is transmitted through a plurality of MLs, different QCL RS(s) (/TCI state(s)) may correspond to different MLs. For example, the first/second TCI states may sequentially correspond to ML1/2, respectively.

Proposal A #2-4: A method of using a search space set (SS) configuration to configure different QCL RSs that are SFNed for the same PDCCH DMRS port(s)

Proposal A #2-4-1: A base station may configure one QCL RS(s) (/TCI state) through a CORESET configuration, and may configure additionally QCL RS(s) (/TCI state(s)) through a search space set (SS) configuration including the CORESET configuration.

In a search space set (SS) configuration, a related CORESET ID may be included, and a configuration of a CORESET identified by the corresponding CORESET ID may be included in the corresponding search space set (SS) configuration. That is, a TCI state in a CORESET configuration associated with an SS configuration is configured, and also a TCI state included in the corresponding SS configuration may be configured together.

The above proposal may be applied when a PDCCH DMRS is transmitted through an SFN and/or when the same DCI is transmitted through repetition/fraction through multiple MLs. When the above proposal is applied when a PDCCH DMRS is transmitted through an SFN, it may be assumed that a PDCCH DMRS transmitted in a CORESET is transmitted through an SFN. On the other hand, when the above proposal is applied when the same DCI is transmitted repetition/fraction through a plurality of MLs, different QCL RS(s) (/TCI state(s)) may correspond to different MLs. For example, a TCI state (e.g., TCI state 1) configured through a CORESET configuration and an additional TCI state configured through an SS configuration may sequentially correspond to ML1/2, respectively.

Meanwhile, when configuring/indicating/defining additional TCI state(s) (/QCL RS(s)) through a separate route in addition to a TCI state configured in a CORESET as in the above method, when trying to change each TCI state(s), it should be changed in an independent method. Accordingly, it may have a disadvantage in that the delay/signaling overhead for changing the TCI state(s) increases.

Proposal A #2-4-2: A base station may configure a number of QCL RS(s) (/TCI state(s)) through an SS configuration, here, a TCI state of a CORESET configuration associated with an SS configuration (i.e., a CORESET configuration identified by a CORESET ID in an SS configuration) may be ignored. In other words, QCL RS(s) (/TCI state(s)) based on an SS configuration may have priority over a TCI state of a CORESET configuration associated with the SS configuration.

The above proposal may be applied when a PDCCH DMRS is transmitted through an SFN and/or when the same DCI is transmitted through repetition/fraction through multiple MLs. When the above proposal is applied when a PDCCH DMRS is transmitted through an SFN, it may be assumed that a PDCCH DMRS transmitted in a CORESET associated with the SS configuration is transmitted through an SFN. In this case, a plurality of QCL RS(s) (/TCI state(s)) configured through an SS configuration is referenced, and a TCI state configuration of a CORESET configuration associated with the SS configuration may be ignored. On the other hand, when the above proposal is applied when the same DCI is transmitted repetition/fraction through a plurality of MLs, different QCL RS(s) (/TCI state(s)) may correspond to different MLs. For example, a plurality of TCI states (e.g., TCI state 1/2) configured through an SS configuration may sequentially correspond to ML1/2, respectively, and TCI state (e.g., TCI state 1) configured through a CORESET configuration may be ignored.

As described above, when a plurality of TCI state(s) (/QCL RS(s)) may be configured/indicated in an SS configuration, there is an advantage that a TCI state combination can be changed based on single signaling when TCI state(s) is changed. For example, when a TCI state combination of {A, B} is configured, the TCI state combination may be changed to {C, D}, etc. based on a single MAC CE message. In this case, compared to the proposed A #2-4-1 scheme, there is an advantage in that the delay/signaling overhead for changing the TCI state(s) can be reduced.

Proposal A #3: Three or more QCL RSs may be configured in a TCI-State, which is a parameter for a QCL RS configuration of a PDSCH/PDCCH (DMRS). When a TCI-State in which three or more QCL RSs are configured is configured for PDSCH/PDCCH (DMRS) transmission, a terminal may assume that the indicated DMRS port(s) is configured with an SFN based on the QCL RSs (or whether to perform an SFN operation may be explicitly configured/indicated). In addition, a terminal may perform channel estimation/compensation based on the QCL RSs.

The current standard defines a higher layer parameter called 'TCI state (TCI-State)' for a QCL RS configuration of a PDSCH/PDCCH, and a definition of the TCI-State is shown in Table 7 above.

As can be seen in Table 7, one TCI-State may have a total of two QCL RSs such as qcl-Type1/qcl-Type2. In the case of qcl-Type1, one of TypeA/TypeB/TypeC may be configured, and in qcl-Type2, TypeD may be configured. Since TypeD means an RS for a reception beam (i.e., spatial reception parameter) of the terminal, one RS capable of acquiring channel information such as a Doppler shift/a Doppler spread/an average delay/a delay spread may be configured per TCI-State.

It may be defined so that a QCL RS may be additionally configured to the TCI-State parameter. Through this, when PDSCH/PDCCH DMRS port(s) is transmitted through an SFN, the reception performance of a terminal can be improved by configuring/indicating a QCL RS for each channel before combining.

For example, qcl-Type1 and qcl-Type3 may be configured in a specific TCI-State, and each may correspond to a different RS with one type of TypeA/TypeB/TypeC. When this TCI-State is configured/indicated as a QCL RS for PDSCH/PDCCH DMRS port(s), a terminal may receive the PDSCH/PDCCH assuming that the DMRS port(s) is configured with an SFN.

As another example, qcl-Type1, qcl-Type2, qcl-Type3 may be configured in a specific TCI-State, and each of qcl-Type1 and qcl-Type3 may correspond to a different RS with one type of TypeA/TypeB/TypeC, and a RS having TypeD may be configured for qcl-Type2. Here, since one RS having TypeD is configured, it can be assumed that the same TypeD is applied to the qcl-Type1 and the qcl-Type3.

Meanwhile, qcl-Type1, qcl-Type2, qcl-Type3, qcl-Type4 may be configured in a specific TCI-State, and each of qcl-Type1 and qcl-Type3 may correspond to a different RS with one of TypeA/TypeB/TypeC, and qcl-Type2 and qcl-Type 4 have TypeD, and different RSs may be configured for qcl-Type2 and qcl-Type 4, respectively. Here, a correspondence relationship between qcl-Type1 and qcl-Type2 may be provided, and a correspondence relationship between qcl-Type3 and qcl-Type4 may be provided. Based on the correspondence relationship, when a terminal receives a RS for qcl-Type1, the terminal may apply a reception beam for a RS of qcl-Type2 may be applied (e.g., apply the same spatial reception parameter). Also, when a terminal receives a RS for qcl-Type2, the terminal may apply a reception beam for a RS of qcl-Type4 (e.g., apply the same spatial reception parameter).

The above proposal may be applied when a PDCCH DMRS is transmitted through an SFN and/or when the same DCI is transmitted through repetition/fraction through multiple MLs. When the above proposal is applied when the same DCI repetition/fraction is transmitted through a plurality of MLs, different QCL RS(s) (/TCI state(s)) may correspond to different MLs. For example, qcl-Type1 and qcl-Type3 may be configured in a specific TCI-State, and each may correspond to a different RS with one type of TypeA/TypeB/TypeC. When this TCI-State is configured/indicated as QCL RSs for a plurality of MLs, qcl-Type1/3 may sequentially correspond to ML1/2, respectively. As another example, qcl-Type1, qcl-Type2, and qcl-Type3 may be configured in a specific TCI-State, and each of qcl-Type1 and qcl-Type3 may correspond to a different RS with one type of TypeA/TypeB/TypeC, and a RS with TypeD may be configured for qcl-Type2. In this case, since one RS having TypeD is configured, a terminal may assume that the same TypeD is applied to the qcl-Type1 and the qcl-Type3. qcl-Type1/3 may sequentially correspond to ML1/2, respectively. Meanwhile, qcl-Type1, qcl-Type2, qcl-Type3, and qcl-Type4 may be configured in a specific TCI-State, and each of qcl-Type1 and qcl-Type3 may correspond to a different RS with one type of TypeA/TypeB/TypeC, and qcl-Type2 and qcl-Type 4 have TypeD, and different RSs may be configured for qcl-Type2 and qcl-Type 4, respectively. In this case, the qcl-Type1 and the qcl-Type2, and the qcl-Type3 and the qcl-Type4 may have a correspondence relationship, respectively. The correspondence relationship may mean that, when receiving RSs for qcl-Type1 and qcl-Type3, a terminal applies reception beams (e.g., the same spatial Rx parameter) for RSs of qcl-Type2 and qcl-Type4, respectively. In addition, qcl-Type1/2 may correspond to ML1, and qcl-Type 3/4 may correspond to ML2.

Proposal A #4: For a QCL RS configuration of PDSCH (DMRS)/PDCCH (DMRS)/DL RS (CSI-RS, etc.), information on a TCI state combination, which may be configured with one or more TCI state(s), may be configured for a terminal based on higher layer signaling (i.e., L2 signaling).

Table 12 shows an example of applying the proposed method.

TABLE 12

TCI-State-Combination ::= SEQUENCE {
tci-State-CombinationId TCI-State-CombinationId,
tci-State1 TCI-StateId,
tci-State2 TCI-StateId, -- Need R
...
}

As shown in Table 12, a new higher layer parameter (e.g., RRC parameter) that can be composed of a plurality of TCI states may be defined. As described above, when defining a new higher layer parameter composed of a plurality of TCI states, this can have an advantage of applying multiples RSs as a QCL RS of PDSCH (DMRS)/PDCCH (DMRS)/DL RS (CSI-RS, etc.). The above proposal is applicable even when a PDCCH DMRS is transmitted through an SFN and/or the same DCI is transmitted through repetition/fraction through multiple MLs. When the above proposal is applied when the same DCI is transmitted repetition/fraction through a plurality of MLs, different QCL RS(s) (/TCI state(s)) may correspond to different MLs. For example, each first/second TCI state may sequentially correspond to ML1/2.

Meanwhile, a method for configuring a plurality of QCL RS(s) (/TCI state(s)) in the same PDCCH DMRS port(s) proposed above (Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4) described based on 2 different TRPs, but the above proposed methods are not limited to only 2 TRPs. Therefore, the proposed method can be extended and applied to a plurality of TRPs of 2 or more different from each other. In addition, it has been described assuming that each of the proposed methods can be applied to the case of performing SFN transmission or repetition/fraction transmission through multiple ML, but the environment to which the proposed methods are applicable is not limited. For example, SFN transmission and repetition/fraction transmission through multiple MLs may be performed simultaneously. In this case, transmission may be performed based on SFN transmission in each ML. For example, SFN transmission of TRP1/2 in ML1 and SFN transmission of TRP1/2 in ML2 may be performed. And/or, SFN transmission of TRP1/2 in ML1 and SFN transmission of TRP3/4 in ML2 may be performed. And/or, SFN transmission of TRP1/2 in ML1 and SFN transmission of TRP2/3 in ML2 may be performed. And/or, SFN transmission of TRP1/2 in ML1 and single TRP transmission of TRP3 in ML2 may be performed. As described above, depending on what type of SFN transmission and/or repetition/fraction transmission through multiple MLs is configured/indicated (according to a transmission method), the total number of TCI state(s) (/QCL RS(s)) may be determined. And/or, SFN transmission and/or repetition/fraction transmission through multiple MLs may be determined in what form (transmission method) according to the total number of TCI state(s) (/QCL RS(s)) configured/indicated to a terminal according to the proposed method.

Meanwhile, when performing SFN transmission and/or repetition/fraction transmission through multiple MLs based on a method for configuring a plurality of QCL RS(s) (/TCI state(s)) in the same PDCCH DMRS port(s) proposed above (Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/proposal A #2-4-1/proposal A #2-4-2/proposal A #3/proposal A #4), a default beam and/or default TCI state(s) (/QCL RS(s)) for PDSCH reception according to the proposed method should be defined.

Proposal A #5: when an offset value between DCI and a PDSCH scheduled through the DCI is greater than or equal to a specific threshold value (e.g., higher layer parameter timeDurationForQCL) and there is no TCI field within DCI, the following method may be applied.

Proposal A #5-1: When configured/indicated to perform repetition/fraction transmission through multiple MLs, a plurality of QCL RSs (corresponding to different TRPs) configured/indicated/defined in multiple MLs (s) (/TCI state(s)) may be equally applied to PDSCH reception. In this case, a terminal may assume multi-TRP transmission when receiving the PDSCH. The multi-TRP transmission may mean transmission in which different TRPs correspond to different transport layer groups (/DMRS port group/ (DMRS) CDM group). And/or, it may mean transmission in which different TRPs correspond to different resources in a frequency/time domain (in the form of repeating the same data in different TRPs). For the multi-TRP transmission, a specific scheme may be configured/indicated/defined for a terminal based on a fixed rule and/or L1/L2 signaling. and/or;

Proposal A #5-2: When configured/indicated to perform SFN transmission, a plurality of QCL RS(s) (/TCI state(s)) (corresponding to different TRPs) may be equally applied to PDSCH reception. In this case, a terminal may assume SFN transmission when receiving a PDSCH.

Proposal A #5-3: When configured/indicated to perform repetition/fraction transmission through multiple MLs, and/or when configured/indicated to perform SFN transmission, specific QCL RS(s) (/TCI state) among multiple QCL RS(s) (/TCI state(s)) configured/indicated/defined for multiple MLs and/or SFN transmission (corresponding to different TRPs) may be applied when receiving a PDSCH. In this case, a terminal may assume that it is a single-TRP transmission when receiving a PDSCH.

Proposal A #5-3-1: The specific QCL RS(s) (/TCI state) may be determined based on a location/index of a resource for multiple MLs. For example, it may be determined based on a time resource (e.g., transmitted on earlier (late) symbol in a time domain) and/or a frequency resource (e.g., transmitted on lower (higher) subcarrier) for multiple MLs. And/or;

Proposal A #5-3-2: For the specific QCL RS(s) (/TCI state), a TCI state configured in a CORESET associated with a search space set (SS) configuration may be applied. And/or, Proposal A #5-3-3: A specific TCI state (e.g., first/second/last/lowest/highest TCI state) of a plurality of QCL RS(s) (/TCI state(s)) included in a search space set (SS) configuration (corresponding to different TRPs) may be applied.

Meanwhile, in the proposal A #5-1/5-2, for convenience of explanation, the conditions for applying each proposal were separately described, which does not limit the environment in which the proposed method can be applied. In other words, the proposed method is described so that a method of receiving a PDSCH (i.e., assuming SFN transmission, multi-TRP transmission) can be determined according to a method of receiving a PDCCH (i.e., assuming SFN transmission, assuming repetition/fraction transmission through multiple MLs), but a method of receiving a PDSCH may be determined regardless of a method of receiving a PDCCH. For example, with respect to Proposal A #5-1, the proposed method may be applied even when configured/indicated to perform SFN transmission rather than when configured/indicated to perform repetition/fraction transmission through multiple MLs. (The reverse case is also possible.) The following shows an example of a method of determining a method for receiving a PDSCH regardless of a method for receiving a PDCCH.

When an offset value between DCI and a PDSCH scheduled through the DCI is greater than or equal to a certain threshold value (e.g., higher layer parameter timeDurationForQCL) and there is no TCI field in the DCI, Example-1) A terminal may assume multi-TRP transmission when receiving a PDSCH. The multi-TRP transmission may have the same meaning as proposal A #5-1. (This means a PDSCH reception operation in Proposal A #5-1. TCI state(s) (/QCL RS(s)) may be equally applied.)

Example-2) A terminal may assume SFN transmission when receiving a PDSCH. (This means a PDSCH reception operation in Proposal A #5-2. TCI state(s) (/QCL RS(s)) may be equally applied.)

Example-3) A terminal may assume single-TRP transmission when receiving a PDSCH. (This means a PDSCH reception operation in Proposal A #5-3. TCI state(s) (/QCL RS(s)) may be equally applied.)

It is defined as a fixed rule to apply a specific method and/or a base station may configure a specific method for a terminal through separate L1/L2 signaling, among the PDSCH reception methods (regardless/independent of a method of receiving a PDCCH). For example, even when configured/indicated to perform repetition/fraction transmission through multiple MLs for PDCCH transmission, PDSCH transmission may be configured/indicated to be based on SFN transmission according to separate L1/L2 signaling. In the case of the above method, it may have an advantage that a transmission method (i.e., multi-TRP, SFN, or single TRP, etc.) of a PDSCH can be configured regardless of a transmission method (i.e., repetition, fraction, or SFN, etc.) of a PDCCH. The specific PDSCH reception method may be configured/indicated/defined in a CORESET unit and/or a BWP unit and/or a serving cell unit. For example, when configured/indicated/defined in units of CORESET, a PDSCH may be received according to a method configured in a CORESET in which DCI (/PDCCH(s)) for scheduling the PDSCH is detected. In this case, a reception method of a PDSCH scheduled through DCI detected through different CORESETs may be different. When configured/indicated/defined in units of BWPs, it may be assumed that the same PDSCH reception method is applied within the same BWP, and when BWPs are different, different PDSCH reception methods may be applied.

The above proposal method (Proposal A #5/Proposal A #5-1/Proposal A #5-2/Proposal A #5-3/Proposal A #5-3-1/Proposal A #5-3-2/Proposal A #5-3-3) may also be applied when an offset value between DCI and a PDSCH scheduled through the DCI is less than a specific threshold value (e.g., higher layer parameter timeDurationForQCL), and even if a CORESET of the lowest index among the most recent slots in which the monitoring occasion is defined is a CORESET and/or a CORESET associated with a SS configuration in which a plurality of QCL RS(s) (/TCI state(s)) are configured according to the proposed method (Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4).

A specific method among the proposed methods (Proposal A #5/Proposal A #5-1/Proposal A #5-2/Proposal A #5-3/Proposal A #5-3-1/Proposal A #5-3-2/Proposal A #5-3-3) is fixedly applied (e.g., predefined or determined by a predefined rule) or a specific method among the proposed methods may be configured/indicated to be applied based on L1/L2 signaling.

Proposal #2: A method of configuring different DMRS ports in the same transmission layer(s)

Proposal B #1: N-layer transmission method using 2N (N is a natural number) DMRS ports Proposal B #1-1: Transmission method using antenna port to layer mapping Based on a predetermined signaling (e.g., by RNTI/DCI format/L2 signaling (e.g., RRC/MAC CE)/L1 signaling (e.g., DCI)), a base station may configure/indicate for a terminal that an HST-SFN operation is performed. A terminal receiving the configuration/indication may apply a specific rule for antenna port to-layer mapping. Examples of the specific rule above are as follows.

A1: Based on the number of DMRS port(s) included in a specific CDM group (e.g., the lowest CDM group/the highest CDM group/CDM group #0/#1/#2/CDM group including more (or fewer) DMRS port(s), etc.) among the DMRS port(s) indicated through an antenna port(s) field in DCI (or half of the total number of the indicated DMRS port(s)), the number of transmission layers may be determined. Here, transmission symbols of each layer may be sequentially (e.g., an ascending order/a descending order/an order indicated in an antenna port(s) field, etc.) and/or repeatedly mapped to DMRS port(s) in each CDM group.

FIG. 15 is a diagram illustrating DMRS antenna port to layer mapping according to an embodiment of the present disclosure.

In FIG. 15, $y^{(p)}(i)$ is the i-th transmission symbol of the antenna port p, and $x^{(v)}(i)$ is the i-th transmission symbol of the v-th layer.

In the case of FIG. 15(a), it illustrates a case in which two DMRS ports 1000 and 1002 are indicated through an antenna port(s) field. Here, the number of transmission layers actually transmitted may be defined as 1 corresponding to half the number of indicated DMRS port(s). A transmission symbol of the transmission layer may be repeatedly mapped to the antenna port 1000 and 1002 and transmitted simultaneously.

In the case of FIG. 15(b), an example of a case in which 1000, 1001, 1002, 1003 antenna ports are indicated through an antenna port(s) field. Here, the number of transmission layers actually transmitted may be defined as 2 corresponding to half the number of indicated DMRS port(s). A transmission symbol of the first transmission layer is repeatedly mapped to antenna ports 1000 and 1002, and a transmission symbol of the second transmission layer is repeatedly mapped to antenna ports 1001 and 1003, and may be transmitted simultaneously.

It is assumed that the number of transmission layers is determined based on the number of DMRS port(s) included in a specific CDM group (e.g., lowest/highest/CDM group #0/#1/#2/including more (or fewer) DMRS port(s), etc.) among DMRS port(s) indicated through an antenna port(s) field in DCI (or half of the total number of the indicated DMRS port(s)) according to the proposal A1. In this case, when calculating a transport block size (TBS) for a PDSCH scheduled by the DCI, the TBS may be calculated based on the newly defined number of transmission layers based on the proposal. For example, in the step below (step 2) among the steps for TBS determination described above, υ may be replaced based on the A1 proposal.

2) An Unquantized intermediate variable ($N_{info}$) is obtained by $N_{info}=N_{RE} \cdot R \cdot Q_m \cdot \upsilon$.

In the proposal of A1, it is assumed that an antenna port(s) field is defined based on the DMRS table defined in Rel-15/16. For this purpose, a new DMRS table may be introduced and/or a new DCI field may be defined. In this case, the actual number of transmission layers and/or whether to perform an SFN operation (i.e., antenna port to layer mapping information) and/or antenna port index(es) may be indicated explicitly through an antenna port(s) field and/or the new DCI field.

Meanwhile, when the number of DMRS port(s) included in different CDM groups in the proposal of A1 of the proposal B #1-1 is not the same, in antenna port(s) included in a specific CDM group, only a part of an entire transmission layer may be transmitted, or the same transmission layer may be repeatedly transmitted.

FIG. 16 is a diagram illustrating DMRS antenna port to layer mapping according to an embodiment of the present disclosure.

In the case of FIG. 16(a), an example in which an actual number of transmission layers is determined based on a CDM group including fewer DMRS port(s) is shown. Here, it may be seen that the same transmission layer is repeatedly transmitted for a CDM group including more DMRS port(s).

Meanwhile, in the case of FIG. 16(b), an example in which an actual number of transmission layers is determined based on a CDM group including more DMRS port(s) is shown. Here, it may be seen that only a part of an entire transmission layer is transmitted for a CDM group including fewer DMRS port(s).

As in the example of FIG. 16, even when the number of DMRS port(s) included in different CDM groups is not the same (e.g., when only a part of an entire transmission layer is transmitted in antenna port(s) included in a specific CDM group, or the same transmission layer is repeatedly transmitted), a TBS may be calculated based on a newly defined number of transmission layers. When the actual number of transmission layers is determined based on a CDM group including a smaller number of DMRS port(s) as in the example of FIG. 16(a), a TBS may be calculated based on the number of transmission layers corresponding to the smaller number of DMRS port(s). Alternatively, when the actual number of transmission layers is determined based on a CDM group including a larger number of DMRS port(s) as in the example of FIG. 16(b), a TBS may be calculated based on the number of transmission layers corresponding to the larger number of DMRS port(s). For example, in the second step below among the steps for TBS determination described above, v may be replaced with the number of transmission layers calculated based on the A1 proposal.

2) An Unquantized intermediate variable ($N_{info}$) is obtained by $N_{info}=N_{RE} \cdot R \cdot Q_m \cdot \upsilon$.

When a plurality of TCI states and/or a plurality of QCL RSs corresponding to TypeA/TypeB/TypeC are configured/indicated for a terminal in addition to the proposed method, different TCI states and/or QCL RSs may respectively correspond to DMRS port(s) of different CDM groups.

Proposal B #1-2: Transmission method using a relationship between a PDSCH antenna port and a DMRS antenna port In the existing standard, it was assumed that PDSCH antenna port(s) and DMRS antenna port(s) (DMRS port(s) indicated through an antenna port(s) field in DCI) are identical to each other (defined by the same 1000 series number). However, when an SFN method is to be applied, this assumption may not hold. Therefore, a new definition may be required for a relationship between PDSCH antenna port(s) and DMRS antenna port(s). In the proposal below, a method of configuring/indicating antenna port(s) to which a DMRS will be transmitted and (PDSCH) antenna port(s) to which a transmission layer will be mapped, through an antenna port(s) field in DCI is proposed in the proposal below.

A1: based on predetermined signaling (e.g., by RNTI/DCI format/L2 signaling (e.g., RRC/MAC CE)/L1 signaling (e.g., DCI)), a base station may configure/indicate for a terminal that an HST-SFN operation is performed. A terminal receiving the configuration/indication may refer to a specific DMRS table (e.g. Rel-17 DMRS table for HST-SFN) and/or apply a specific rule for channel estimation and antenna port-to-layer mapping for the referenced DMRS table. For this, PDSCH antenna port(s)/DMRS antenna port(s) may be configured/indicated to a terminal. In addition, PDSCH antenna port(s) may be defined again from the DMRS antenna port(s). And/or, the DMRS antenna port(s) may be divided into different groups. To this end, a base station may explicitly/implicitly perform necessary signaling. (Examples of more detailed explicit/implicit signaling will be described later) And/or, based on a sum of DMRS antenna port(s) corresponding to the different groups, PDSCH antenna port(s) may be re-defined.

Table 14 below shows an example of the proposed method.

Table 13 exemplifies a DMRS table of Rel-15.

TABLE 13

| | One Codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | reserved | reserved |

Table 14 exemplifies a DMRS table according to an embodiment of the present disclosure.

TABLE 14

| | One Codeword: Codeword 0 enabled, Codeword 1 disabled | | | |
|---|---|---|---|---|
| Value | Number of DMRS CDM group(s) without data | DMRS port(s) | Temporary DMRS port(s) group 0 | Temporary DMRS port(s) group 1 |
| 0 | 1 | 0 | N/A | N/A |
| 1 | 1 | 1 | N/A | N/A |
| 2 | 1 | 0, 1 | N/A | N/A |
| 3 | 2 | 0 | N/A | N/A |
| 4 | 2 | 1 | N/A | N/A |
| 5 | 2 | 2 | N/A | N/A |
| 6 | 2 | 3 | N/A | N/A |
| 7 | 2 | 0,1 | N/A | N/A |
| 8 | 2 | 2, 3 | N/A | N/A |
| 9 | 2 | 0-2 | N/A | N/A |
| 10 | 2 | 0-3 | N/A | N/A |
| 11 | 2 | 0,2 | N/A | N/A |
| 12 | 2 | 0 | 0 | 2 |
| 13 | 2 | 0, 1 | 0, 1 | 2, 3 |
| 14 | reserved | reserved | reserved | reserved |
| 15 | reserved | reserved | reserved | reserved |

In Table 14, DMRS port(s) indicated through the DMRS port(s) column may mean antenna port(s) (i.e., antenna port(s) to which transmission layer(s) are mapped) corresponding to PDSCH antenna port(s) as before. In Table 14, temporary DMRS port(s) group (TDG) 0/1 may mean antenna port(s) through which a DMRS corresponding to the PDSCH is transmitted. In Table 14, a symbol transmitted from PDSCH antenna port(s) and a symbol transmitted from DMRS antenna port(s) corresponding to different TDGs may have a relationship as shown in Equation 3 below.

$$\begin{bmatrix} a_{k,l}^{(p_0,\mu)} \\ \vdots \\ a_{k,l}^{(p_{N-1},\mu)} \end{bmatrix} = \beta W \begin{bmatrix} \tilde{a}_{k,l}^{(\tilde{p}_0,\mu)} \\ \vdots \\ \tilde{a}_{k,l}^{(\tilde{p}_{M_1-1},\mu)} \\ \tilde{a}_{k,l}^{(\tilde{p}_0,\mu)} \\ \vdots \\ \tilde{a}_{k,l}^{(\tilde{p}_{M_2-1},\mu)} \end{bmatrix} \text{ where } W = \begin{bmatrix} I_{M_1} & I_{M_2} \end{bmatrix}$$

[Equation 3]

$\tilde{a}_{k,l}^{(\tilde{p}_x,\mu)}$: transmission symbol corresponding to (k,l),μ and TDG 0의 DMRS antenna port $\tilde{p}_x$ $\tilde{a}_{k,l}^{(\tilde{p}_x,\mu)}$: transmission symbol corresponding to (k,l),μ 및 TDG 1 의 DMRS antenna port $\tilde{p}_x$ In Equation 3, (k,l) may represent the k-th subcarrier and the l-th OFDM symbol, and μ may mean a numerology indicator. And, N is the total number of antenna port(s) corresponding to a PDSCH, $M_1$ is the total number of DMRS antenna port(s) corresponding to TDG (temporary DMRS port(s) group) 0, $M_2$ is is the total number of DMRS antenna port(s) corresponding to TDG 1. $I_M$ denotes an identity matrix whose size corresponds to M. β represents a scaling factor.

In Equation 3, a transmission symbol is described as an example, but an example for describing the relationship may not be limited to a transmission symbol, and it may be expressed as a transmission signal/a reception signal/a reception symbol/a resource element, etc., and, this may be used for definition to explain the relationship between the PDSCH antenna port(s) and the DMRS antenna port(s). In the case of applying the above proposed method, an example of the value 13 of Table 14 is shown in Equation 4 below.

$$\begin{bmatrix} a_{k,l}^{(1000,\mu)} \\ a_{k,l}^{(1001,\mu)} \end{bmatrix} = \begin{bmatrix} 1 & 0 & 1 & 0 \\ 0 & 1 & 0 & 1 \end{bmatrix} \begin{bmatrix} \tilde{a}_{k,l}^{(1000,\mu)} \\ \tilde{a}_{k,l}^{(1001,\mu)} \\ \tilde{a}_{k,l}^{(1002,\mu)} \\ \tilde{a}_{k,l}^{(1003,\mu)} \end{bmatrix}$$

[Equation 4]

In order to apply the proposed method, the following method may be considered in order to configure/indicate for a terminal with PDSCH antenna port(s) and DMRS antenna port(s).

Example of an explicit method:

M1: Information on antenna port(s) corresponding to PDSCH antenna port(s) in a DMRS table, and DMRS antenna port(s) of different TDGs, and a TDG corresponding to each DMRS antenna port(s) may be indicated. An example of this is shown in Table 15 below.

Example of an implicit method:

M2-1: Antenna port(s) corresponding to PDSCH antenna port(s) in a DMRS table, and DMRS antenna port(s) of different TDGs may all be indicated. Here, a TDG and PDSCH antenna port(s) to which each DMRS antenna port(s) correspond may be defined by a predetermined rule between a base station and a terminal. An example of this is shown in Table 16 below.

M2-2: Antenna port(s) corresponding to PDSCH antenna port(s) in a DMRS table, and DMRS antenna port(s) of a specific TDG may be indicated. Here, DMRS antenna port(s) included in another TDG other than the TDG including the indicated DMRS antenna port(s) may be defined by a predetermined rule between a base station and a terminal. An example of this is shown in Table 17 below.

TABLE 15

One Codeword:
Codeword 0 enabled,
Codeword 1 disabled

| Value | Number of DMRS CDM group(s) without data | DMRS port(s) | Temporary DMRS port(s) group 0 | Temporary DMRS port(s) group 1 |
|---|---|---|---|---|
| 0 | 1 | 0 | N/A | N/A |
| 1 | 1 | 1 | N/A | N/A |
| 2 | 1 | 0,1 | N/A | N/A |
| 3 | 2 | 0 | N/A | N/A |
| 4 | 2 | 1 | N/A | N/A |
| 5 | 2 | 2 | N/A | N/A |
| 6 | 2 | 3 | N/A | N/A |
| 7 | 2 | 0, 1 | N/A | N/A |
| 8 | 2 | 2, 3 | N/A | N/A |
| 9 | 2 | 0-2 | N/A | N/A |
| 10 | 2 | 0-3 | N/A | N/A |
| 11 | 2 | 0, 2 | N/A | N/A |
| 12 | 2 | 0 | 0 | 2 |
| 13 | 2 | 0, 1 | 0, 1 | 2, 3 |
| 14 | reserved | reserved | reserved | reserved |
| 15 | reserved | reserved | reserved | reserved |

TABLE 16

One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0-3 |
| 13 | 2 | 0, 2 |
| 14 | reserved | reserved |
| 15 | reserved | reserved |

TABLE 17

One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0 |
| 13 | 2 | 0, 1 |
| 14 | reserved | reserved |
| 15 | reserved | reserved |

In Tables 15 to 17, a portion corresponding to the value 12/13 is a newly added portion compared to the Rel-15 DMRS table.

In the case of Table 15, in the case of (a), antenna port(s) corresponding to PDSCH antenna port(s) may be indicated through the DMRS port(s) column. The antenna port(s) of the DMRS corresponding to the PDSCH may be indicated through temporary DMRS port(s) group 0/1, respectively.

In the case of Table 16, PDSCH antenna port(s) may be a part of antenna port(s) indicated through DMRS port(s), and may be determined based on a CDM group to which the DMRS port(s) belongs. For example, DMRS port(s) belonging to a specific CDM group (e.g., #0 or #1 or #2 or the lowest or highest) may be defined to correspond to PDSCH antenna port(s). A TDG corresponding to each DMRS antenna port(s) may also be defined based on a CDM group. For example, DMRS port(s) included in a lowest CDM group or CDM group 0 may be included in TDG 0, and DMRS port(s) included in the remaining CDM group or CDM group 1 may be included in TDG 1.

In the case of Table 17, antenna port(s) corresponding to PDSCH antenna port(s) may be indicated through the DMRS port(s) column, and the antenna port(s) are included in a specific TDG. DMRS antenna port(s) to be included in another TDG may be configured as all or part of DMRS port(s) included in a CDM group different from the indicated DMRS port(s), and may be configured with the same number of port(s) as the indicated DMRS port(s).

In the above example, it is assumed that a new row is added compared to the Rel-15 DMRS table, but the proposed method is applied based on the existing DMRS table, so a method of different interpretation may also be applied.

In addition to the proposed method, an actual rank value, and/or the number of DMRS ports, and/or port-to-layer mapping information may be indicated through a separate field in DCI. And/or, whether an SFN operation is applied or not and port-to-layer mapping information may be configured based on L2 signaling.

When a plurality of TCI states and/or a plurality of QCL RSs corresponding to TypeA/TypeB/TypeC are configured/indicated for a terminal in addition to the proposed method, different TCI states and/or QCL RSs may respectively correspond to DMRS port(s) of different CDM groups.

With respect to the proposed method under Proposal #1 (i.e., method of configuring different QCL reference signals in the same DMRS port(s)) and the proposed method under Proposal #2 (i.e., method of configuring different DMRS ports in the same transmission layer(s)), there may be a difference between a method for implementing a receiving end of a terminal to support the proposed method below Proposal #1 and a method for implementing a receiving end of a terminal for supporting the proposed method below Proposal #2. Also, this may result in differences in implementation complexity. In consideration of the above implementation complexity, different methods may be implemented for each terminal. In order for a base station and a terminal to perform an appropriate operation according to the proposed method implemented in a terminal, a terminal may report an operable proposed method to a base station (e.g., by UE capability signaling). A base station may support a method suitable for the corresponding terminal according to the content reported from the terminal (e.g., by L1/L2 signaling).

Proposal #3: A method of configuring/indicating an SFN operation for a plurality of TO (transmission occasion)/ML (monitoring location)

In Rel-16, a new operation for repeated PDSCH transmission is introduced based on a multi-TRP transmission operation. In Rel-17, a PDCCH repeated transmission scheme based on a multi-TRP transmission operation will be discussed. Four operations are introduced as a PDSCH repeated transmission scheme of Rel-16, which corresponds to FDMSchemeA/FDMSchemeB/TDMSchemeA and slot level repetitive transmission.

Hereinafter, a description of the repetitive transmission scheme described in the current TS38.214 standard is shown.

When a UE is configured by higher layer parameter repetitionScheme set to one of 'fdmSchemeA', 'fdmSchemeB', 'tdmSchemeA', if the UE is indicated with two TCI states in a codepoint of the DCI field 'Transmission Configuration Indication' and DM-RS port(s) within one CDM group in the DCI field 'Antenna Port(s)',

- When two TCI states are indicated in DCI and the UE is set to 'fdmSchemeA', the UE shall receive a single PDSCH transmission occasion of the TB with each TCI state associated to a non-overlapping frequency domain resource allocation.
- When two TCI states are indicated in DCI and the UE is set to 'fdmSchemeB', the UE shall receive two PDSCH transmission occasions of the same TB with each TCI state associated to a PDSCH transmission occasion which has non-overlapping frequency domain resource allocation with respect to the other PDSCH transmission occasion.
- When two TCI states are indicated in DCI and the UE is set to 'tdmSchemeA', the UE shall receive two PDSCH transmission occasions of the same TB with each TCI state associated to a PDSCH transmission occasion which has non-overlapping time domain resource allocation with respect to the other PDSCH transmission occasion and both PDSCH transmission occasions shall be received within a given slot.

When a UE is configured by the higher layer parameter PDSCH-config that indicates at least one entry in pdsch-TimeDomainAllocationList containing RepNumR16 in PDSCH-TimeDomainResourceAllocation, the UE may expect to be indicated with one or two TCI states in a codepoint of the DCI field 'Transmission Configuration Indication' together with the DCI field "Time domain resource assignment' indicating an entry in pdsch-TimeDomainAllocationList which contain RepNum16 in PDSCH-TimeDomainResourceAllocation and DM-RS port(s) within one CDM group in the DCI field "Antenna Port(s)".

- When two TCI states are indicated in DCI with 'Transmission Configuration Indication' field, the UE may expect to receive multiple slot level PDSCH transmission occasions of the same TB with two TCI states used across multiple PDSCH transmission occasions.
- When one TCI state is indicated in DCI with 'Transmission Configuration Indication' field, the UE may expect to receive multiple slot level PDSCH transmission occasions of the same TC with one TCI state used across multiple PDSCH transmission occasions.

In addition, in TS 38.331, in relation to the RepetitionSchemeConfig IE for repeat transmission configuration, it is described as shown in Table 18 below.

TABLE 18

ASN1START
TAG-REPETITIONSCHEMECONFIG-START
RepetitionSchemeConfig-r16 ::= SEQUENCE{
  fdm-TDM               SetupRelease { FDM-TDM }
OPTIONAL, -- Need M
  slotBased             SetupRelease { SlotBased }
OPTIONAL -- Need M
}
FDM-TDM ::=              SEQUENCE {
  repetitionScheme-r16    ENUMERATED {fdmSchemeA, fdmSchemeB,tdmSchemeA },
  startingSymbolOffsetK-r16   INTEGER (0..7)
OPTIONAL -- Need R
SlotBased ::=            SEQUENCE{
  tciMapping-r16        ENUMERATED {cyclicMapping, sequenticalMapping},
  sequenceOffsetforRV-r16   INTEGER (1..3)
}
TAG-REPETITIONSCHEMECONFIG-STOP
ASN1STOP Table 19 exemplifies the description of the fields of the RepetitionSchemeConfig IE.

TABLE 19 fdm-TDM
Configures UE with a repetition scheme scheme among fdmSchemeA, fdmSchemeB and tdmSchemeA.
sequenceOffsetforRV
For slot-based repetition scheme, selected RV (redundancy version) sequence is applied to transmission occasions associated to the first TRP (i.e., the first TCI state). The RV sequence associated to the second TRP (i.e., the second TCI state) is determined by a RV offset from that selected RV sequence
slotBased
Configures UE with slot based repetition scheme. When slot based repetition scheme is configured, the parameter repetitionNumber is present in IE PDSCH-TimeDomainResourceAllocationList.
startingSymbolOffsetK
The starting symbol of the second transmission occasion has K symbol offset relative to the last symbol of the first transmission occasion. When UE is configured with tdmSchemeA, the parameter startingSymbolOffsetK is present, otherwise absent.
tciMapping
Enables TCI state mapping method to PDSCH transmission occasions.

As can be seen from the contents described in the standard (e.g., TS 38.214/TS 38.331), two TCI states may be indicated to the UE for repeated PDSCH transmission. In addition, each TCI state may correspond to different resource regions (e.g., time resource/frequency resource, etc.) based on a determined rule. Through this, different TRPs corresponding to different TCI states repeatedly transmit a PDSCH based on the same transport block (TB) using different resource regions, thereby time/frequency diversity can be obtained to improve system performance. Meanwhile, the repeated transmission operation may be considered to be utilized in the HST-SFN scenario. That is, it can be used to improve system performance by partially modifying the existing operation according to the HST-SFN scenario. For example, in the repeated PDSCH transmission operation of Rel-16, a base station may configure/indicated two TCI states to a terminal. After configuring/indicating a plurality of transmission occasions (TOs), the two TCI states may be mapped to different TOs, respectively. Here, if the two TCI states are not mapped to different TOs, but can be used for indicating different QCL assumptions for signals configured with an SFN in the same TO, it is possible to support a repeated transmission operation of signals configured with an SFN is performed based on the two TCI states. In addition, in the HST-SFN scenario, it is possible to indicate each QCL assumption of different signals configured with an SFN and to transmit repeatedly signals configured with an SFN through multiple TOs. Based on this repeated transmission technique, reliability and coverage for PDSCH transmission in the HST-SFN scenario can be improved.

Figure 17:
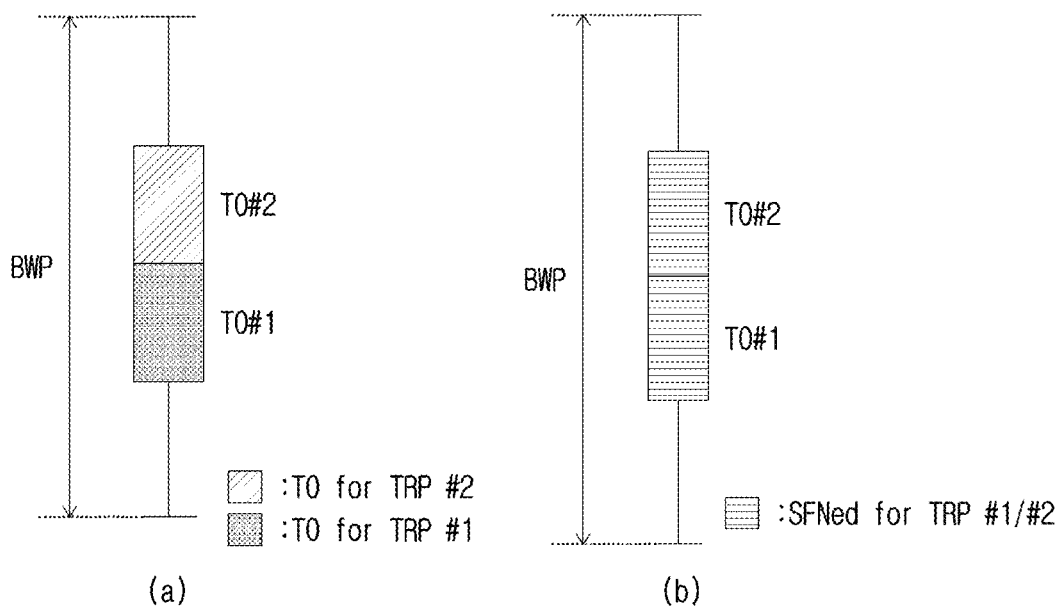
FIGS. 17 to 19 are diagrams for explaining a repeated transmission operation according to an embodiment of the present disclosure.
Figure 18:
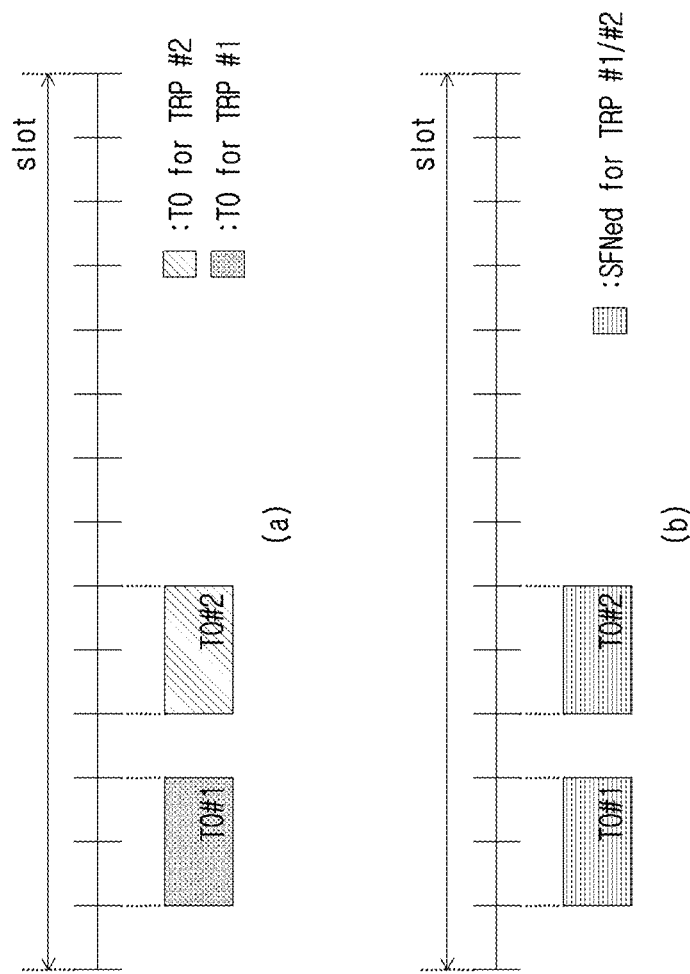
Figure 19:
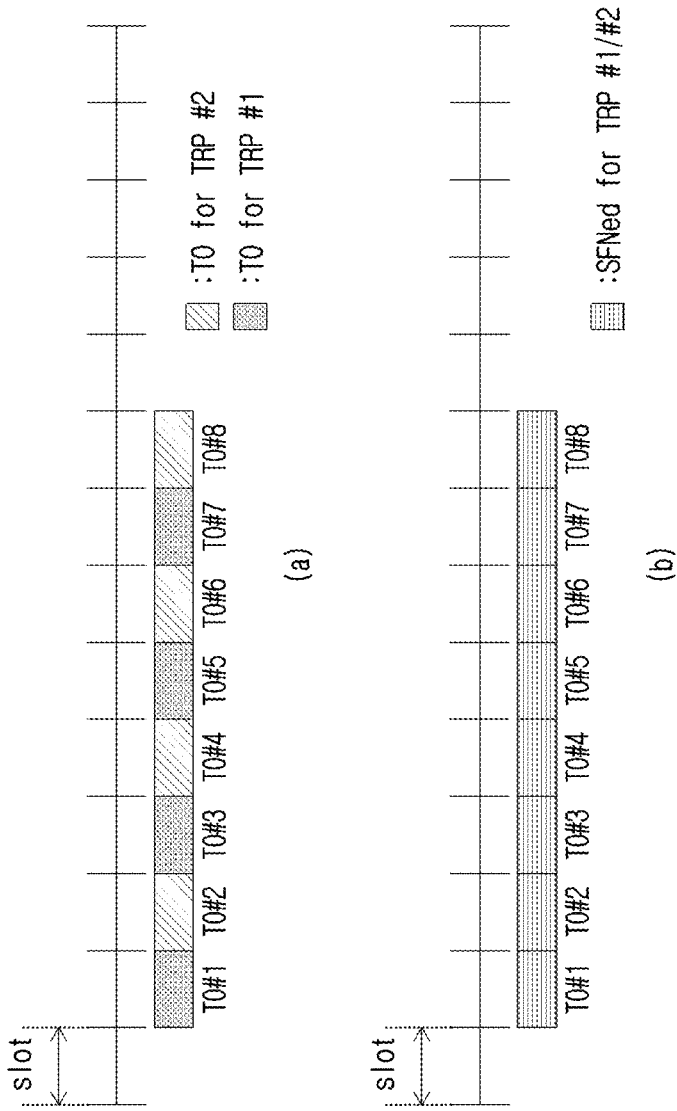

FIGS. 17 to 19 are diagrams for explaining a repeated transmission operation according to an embodiment of the present disclosure.

FIG. 17(a) illustrates the existing operation of Rel-16, FIG. 17(b) illustrates the proposed operation of the present disclosure. In addition, FIG. 18(a) illustrates the existing operation of Rel-16, FIG. 18 (b) illustrates the proposed operation of the present disclosure. In addition, FIG. 19(a) illustrates the existing operation of Rel-16, FIG. 19(b) illustrates the proposed operation of the present disclosure.

Meanwhile, the method of repeatedly transmitting SFNed signals and indicating each QCL assumption of different SFNed signals described above may also be considered in PDCCH repeated transmission to be discussed in Rel-17. As described in Proposal #1 above, the same DCI may be transmitted through multiple monitoring locations (ML) based on a repetition/fraction method. Here, a situation in which signals transmitted in the multiple MLs do not correspond to different TCI states, and signals transmitted in each ML are SFNed of different signals having different TCI states may be considered. Reliability and coverage for PDCCH transmission in the HST-SFN scenario can be improved based on this repeated transmission technique.

In this proposal, TO (transmission occasion)/ML (monitoring location) may mean a PDSCH transmission region configured/indicated to a terminal for repeated transmission of a PDSCH/a PDCCH transmission region configured/indicated to a terminal for repeated transmission of a PDCCH, respectively.

Proposal C#1: A base station may configure/indicate whether to operate an SFN to a terminal. In the case of a terminal in which an SFN operation is configured/indicated, it may be assumed that, when repeated transmission of a PDSCH/PDCCH is configured/indicated, an SFN signal is repeatedly transmitted through a resource region configured/indicated for the repeated transmission. Here, different TCI states of SFN signals to be repeatedly transmitted may be determined based on a plurality of TCI states configured/indicated for repeated PDSCH/PDCCH transmission.

Four operations are introduced as a PDSCH repeated transmission method of Rel-16, which corresponds to FDMSchemeA/FDMSchemeB/TDMSchemeA and slot level repetitive transmission. First, if the case of FDMSchemeA/FDMSchemeB/TDMSchemeA is described, one of the three operations may be configured based on RRC signaling (e.g., 'FDM-TDM' in the repetitionschemeconfig IE). When DCI scheduling a PDSCH indicates two TCI states and DMRS port(s) included in a single CDM group, it may be assumed that a PDSCH is actually transmitted based on the operation. Here, when the proposed method is applied (e.g., a base station configures/indicates whether to operate an SFN to a terminal), a terminal may assume that different signals corresponding to the two TCI states indicated through the DCI through a plurality of TOs scheduled through the DCI are transmitted through an SFN.

FIG. 17 shows a difference between the existing operation and the proposed operation assuming a frequency domain repeated transmission scheme (e.g., FDMSchemeA, FDMSchemeB), and FIG. 18 shows a difference between the existing operation and the proposed operation assuming a time domain repeated transmission scheme (e.g., Assuming TDMSchemeA).

Meanwhile, if the case of slot level repeated transmission is described, the number of repeated transmissions RepNumR16 may be mapped to the PDSCH-TimeDomainResourceAllocation corresponding to time domain scheduling information of a PDSCH based on RRC signaling (e.g., 'Slotbased' in the repetitionschemeconfig IE). When DCI scheduling a PDSCH indicates two TCI states, DMRS port(s) included in a single CDM group, and time domain resource allocation information to which the RepNumR16 (e.g., repetitionNumber in the PDSCH-TimeDomainResourceAllocation field) is mapped, a terminal UE may assume that a PDSCH is transmitted based on slot level repeated transmission through TOs of RepNumR16 scheduled through the DCI. Here, when the proposed method is applied, a terminal may assume that different signals corresponding to the two TCI states indicated through the DCI are SFNed and transmitted through a plurality of TOs scheduled through the DCI. In FIG. 19, for repetition and TCI mapping RepTCIMapping (i.e., tciMapping), cyclic mapping CycMapping (i.e., cyclicMapping) is assumed, and 8 is assumed for the number of repetitions RepNumR16 (i.e., repetitionNumber).

Meanwhile, as proposed in Proposal #1, a resource region in which a plurality of PDCCHs corresponding to the same DCI will be transmitted may be defined. In this case, a plurality of TCI states corresponding to each resource region may be configured/indicated. Here, when the proposed method is applied, a terminal may assume that different signals corresponding to different TCI states are SFNed and transmitted repeatedly (by repetition/fraction) in the plurality of resource regions. For example, two MLs and two TCI states for transmitting a plurality of PDCCHs corresponding to the same DCI may be configured/indicated to a terminal, and different TCI states may be mapped to each ML. In this case, when the proposed method is applied, a terminal may assume that different signals corresponding to the two TCI states are SFNed and transmitted through the two MLs.

Figure 20:
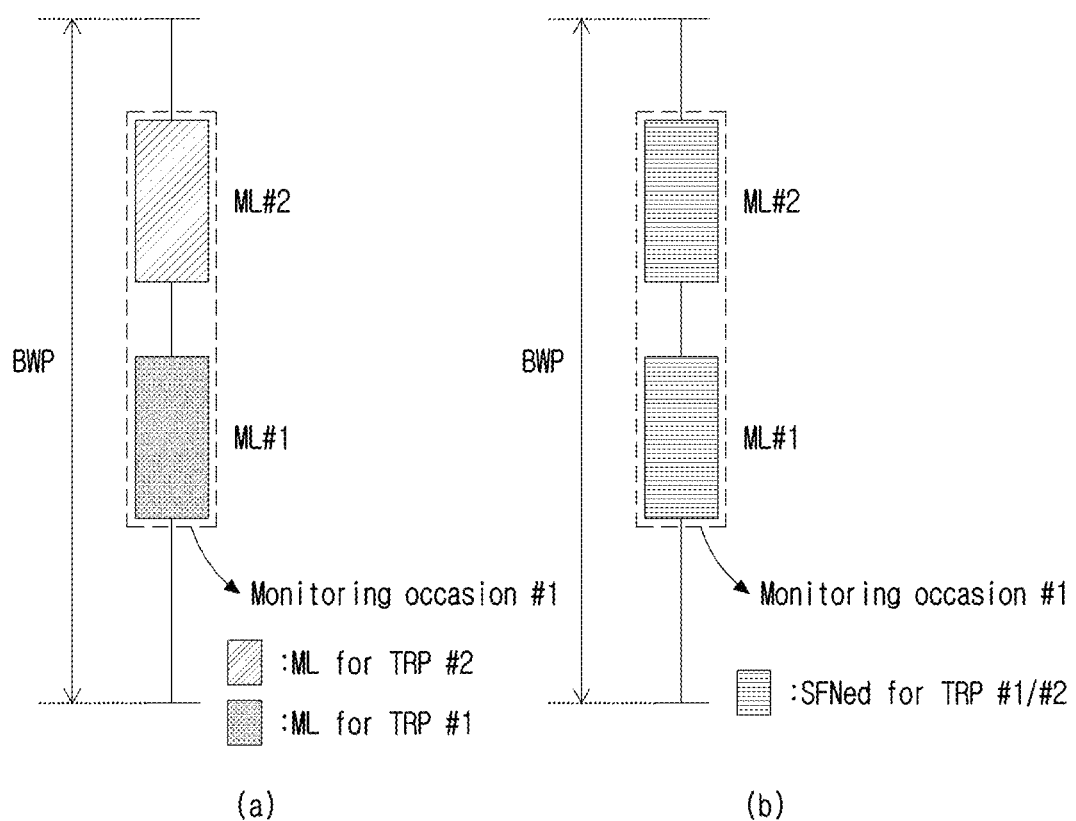
FIGS. 20 and 21 are diagrams for explaining a repeated transmission operation according to an embodiment of the present disclosure.
Figure 21:
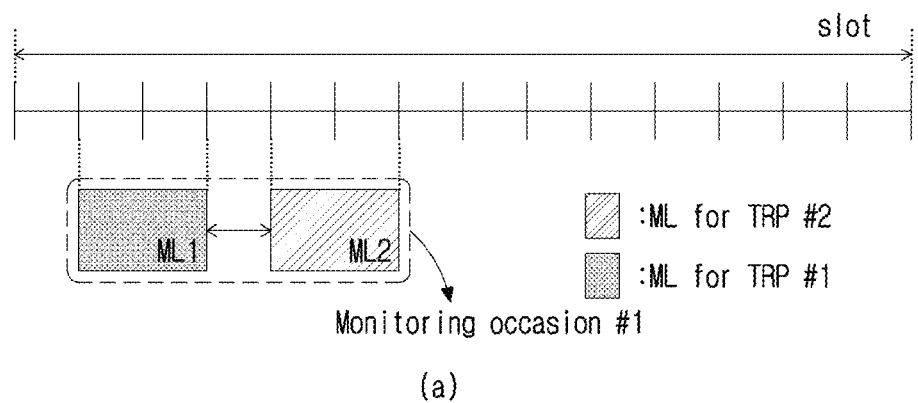
Figure 21:
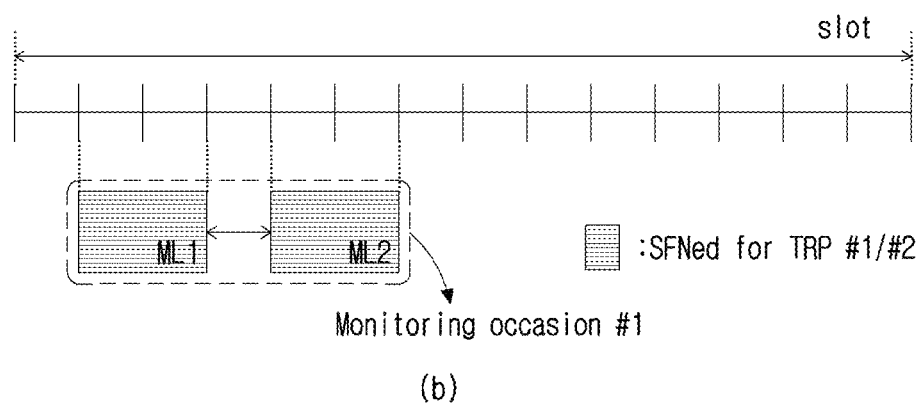

FIGS. 20 and 21 are diagrams for explaining a repeated transmission operation according to an embodiment of the present disclosure.

FIG. 20(a) illustrates the operation of proposal #1, and FIG. 20(b) illustrates the operation of proposal C#1. In addition, FIG. 21(a) illustrates the operation of proposal #1, and FIG. 21(b) illustrates the operation of proposal C#1.

In the following description, a more detailed example of L1/L2 signaling for applying the proposed operation will be described.

Example 1-1) An SFN scheme may be configured through RepTCIMapping configured to a terminal for slot level repeated transmission of a PDSCH. In the current standard, CycMapping (i.e., cyclicMapping) or SeqMapping (i.e., sequentialMapping) may be configured to a terminal through RepTCIMapping (i.e., tciMapping). Here, when CycMapping is configured, different TCI states may be alternately mapped to different TOs, and when SeqMapping is configured, different TCI states may be mapped in units of two contiguous TOs. By applying this proposal, one of CycMapping/SeqMapping/SFNMapping methods may be configured through RepTCIMapping. Here, when the SFNMapping method is configured, it may be assumed that different signals corresponding to each TCI state are configured with an SFN based on a plurality of TCI states configured/indicated to a terminal and are repeatedly transmitted through a plurality of TO regions allocated to the terminal.

Example 1-2) When other conditions are satisfied except for the condition that DMRS port(s) indicated to a terminal is included in a single CDM group among the conditions for the PDSCH slot level repeated transmission (e.g., RepNum16 configuration/indication/indicating one or two TCI states, etc.) and when the DMRS ports indicated to a terminal are included in a plurality of CDM groups, it may be assumed that the SFN method is applied. In this case, it may be assumed that DMRS port(s) applied to actual PDSCH transmission are limited to DMRS port(s) included in a specific CDM group. The above example corresponds to a method of configuring/indicating whether to apply the SFN method using a condition that is not defined in Rel-16. In Rel-16, it is assumed that DMRS port(s) for a PDSCH are included in a single CDM group in case of slot level repeated transmission. Accordingly, the case included in a plurality of CDM groups may be considered as an error case in Rel-16, and this can be used to indicate the above-described proposed operation. However, when a plurality of CDM groups are indicated, there is a constraint that at least 2 layers should be scheduled. As a method for solving this constraint, it may be assumed that only DMRS port(s) included in a specific CDM group among a plurality of indicated CDM groups are applied to actual PDSCH transmission. As an example of the specific CDM group, it may be defined as a fixed rule such as a CDM group including/corresponding to the first port among DMRS port(s) indicated through DCI, or a CDM group of the lowest/highest index. Alternatively, a specific CDM group may be configured/indicated to a terminal based on L1/L2 signaling.

Example 2-1) A parameter capable of configuring an SFN method separately from RepSchemeEnabler, which is an RRC parameter for configuring a specific scheme among FDMSchemeA/FDMSchemeB/TDMSchemeA, may be defined. In addition, based on the defined parameter, whether to operate an SFN may be configured/indicated. Here, if the conditions for FDMSchemeA/FDMSchemeB/TDMSchemeA are satisfied and an SFN method is configured, through a plurality of TOs assigned to a terminal based on FDMSchemeA/FDMSchemeB/TDMSchemeA scheme, a terminal may assume that different signals corresponding to each TCI state are configured with an SFN and repeatedly transmitted based on a plurality of TCI states configured/indicated to the terminal. For example, the parameter for configuring/indicating whether to operate an SFN may be a parameter that can be additionally configured only to a specific scheme. For example, when TDMSchemeA is configured for a terminal, it may be a parameter that can be additionally configured for the terminal. This is because signals configured with an SFN can be used for the purpose of improving coverage by increasing the total energy of transmission signal through repeated transmission in a time domain.

Example 2-2) A new option for configuring a repeated transmission scheme based on an SFN may be added to RepSchemeEnabler, which is an RRC parameter for configuring a specific scheme among FDMSchemeA/FDMSchemeB/TDMSchemeA. Alternatively, an SFN-based repeat transmission scheme may be configured through a separate RRC parameter different from the RepSchemeEnabler. In this case, a plurality of TOs may be defined based on a specific scheme among FDMSchemeA/FDMSchemeB/TDMSchemeA. For example, a specific scheme among FDMSchemeA/FDMSchemeB/TDMSchemeA/FDMSchemeB-SFN/TDMSchemeA-SFN may be configured for a terminal through RepSchemeEnabler. When FDMSchemeB-SFN is configured, a plurality of TOs may be defined based on the FDMSchemeB scheme. When TDMSchemeA-SFN is configured, a plurality of TOs may be defined based on the TDMSchemeA scheme. In addition, when the condition of FDMSchemeB/TDMSchemeA is satisfied, through a plurality of TOs allocated to a terminal based on the FDMSchemeB/TDMSchemeA scheme, the terminal may assume that different signals corresponding to each TCI state are configured with an SFN and repeatedly transmitted based on a plurality of TCI states configured/indicated to the terminal. Alternatively, after a parameter called RepSchemeEnabler-SFN is newly defined, a specific scheme among the repeated transmission schemes based on SFN (e.g., FDMSchemeB-SFN/TDMSchemeA-SFN) may be configured for a terminal through the parameter. In this case, RepSchemeEnabler, which is a parameter of Rel-16, and the newly proposed RepSchemeEnabler-SFN may have mutually exclusive characteristics. In the proposed operation, the definition or operation condition for a TO may be the same as in Example 2-1 above.

Example 2-3) When other conditions are satisfied except for the condition that DMRS port(s) indicated to a terminal is included in a single CDM group among the conditions for FDMSchemeA/FDMSchemeB/TDMSchemeA transmission scheme, and when DMRS ports indicated to a terminal are included in a plurality of CDM groups, as described in various examples of Proposal C#1 (e.g., Example 1-1/1-2/2-1/2-2, etc.), a terminal may assume that one indicated method among FDMSchemeA/FDMSchemeB/TDMSchemeA and an SFN method are combined and applied.

Meanwhile, in the above example, when a plurality of TCI states and a plurality of TOs are configured/indicated to a terminal by using the Rel-16 operation, it is assumed that different signals corresponding to each TCI state are configured with an SFN based on a plurality of TCI states configured/indicated to the terminal and are repeatedly transmitted through a plurality of TO regions allocated to the terminal. Here, a case other than repeated transmission as described in proposal #1 may also be considered (together). In addition, the following methods other than those described in Proposal #1 may also be considered for this purpose.

Example 3) i) When an RRC parameter related to the number of repeated transmissions for slot level repeated transmission of a PDSCH is not configured to a terminal (i.e., all entries in a TDRA field do not include RepNumR16), ii) when the number of repeated transmissions of 2 or more is not indicated (i.e., even if at least one entry in a TDRA field includes RepNumR16, when a RepNum16 value is not indicated as 2 or more through the TDRA field of DCI), and/or iii) when a plurality of TCI states are indicated to a terminal and the indicated DMRS port(s) are included in a single CDM group if RepSchemeEnabler, which is an RRC parameter for configuring a specific transmission method, is not configured, it may be assumed that different signals corresponding to each TCI state are configured with an SFN and transmitted through a resource region allocated to the terminal. Example 3 above corresponds to a method of configuring/indicating whether to apply an SFN method using a condition that is not defined in Rel-16. The above method differs from the previous example 1-1/1-2/2-1/2-2/2-3 in that it does not assume a plurality of TOs. That is, an SFNed signal may be transmitted through an allocated resource region through DCI that does not schedule repeated transmission. However, if slot-level PDSCH repeated transmission is configured through an RRC parameter in Rel-15 (that is, when pdsch-AggregationFactor is set to 2 or more), when an SNF is enabled according to the above proposal, a PDSCH may be transmitted through an SFN with the TCI state indicated in each slot during multi-slot in which a PDSCH is repeatedly transmitted.

Table 20 below exemplifies a dynamic/semi-static configuration for switching/disabling/enabling between MTRP/STRP transmission schemes supported by the existing Rel-16 and an example of the proposed method of the present disclosure. All rows from index 0 to G correspond to the conditions agreed upon in Rel-16, and H1, H2, and H3 correspond to examples of signaling conditions proposed by the present disclosure to indicate an SFN transmission scheme.

H1 corresponds to Example 3, and H2 shows a case in which whether to transmit through an SFN is indicated together with URLLCSchemeEnabler (i.e., RepSchemeEnabler) as Example 2-2. In addition, when the number of CDM groups through which a DMRS port is transmitted in an SFN is two, in order to distinguish it from the condition D" of the 1a/NCJT (a method in which two TRPs transmit DMRS port(s) belonging to two different CDM groups, respectively) transmission scheme, H3 shows that if an SFN technique is configured together with URLLCSchemeEnabler (i.e., RepSchemeEnabler), the SFN configuration is prioritized over 1a/NCJT and transmission in the SFN method is performed, unlike D".

TABLE 20

| Index | TCI states | CDM groups | URLLCRepNum | URLLCScheme Enabler | UE operation |
|---|---|---|---|---|---|
| 0 | 1 | >=1 | Not applicable | Not applicable | Rel 15 |
| A | 1 | 1 | Condition 1 | Configured or not configured | Repetition with "scheme 4" from the same TRP Limits agreed for scheme 4 |
| A' | 1 | >=1 | Condition 2 | Not configured | Rel 15 |
| B | 2 | 1 | Condition 1 | Not configured | Scheme 4 |
| C | 2 | 2 | Condition 2 | Not configured | 1a/NCJT |
| E | 2 | 2 | Condition 4 | Not configured | 1a/NCJT |
| F | 2 | 1 | Condition 4 | Configured | Scheme 2a/2b/3 |
| D" | 2 | 2 | Condition 4 | Configured | 1a/NCJT |
| G' | 1 | >=1 | Condition 2 | Configured | Rel 15 |
| G | 1 | >=1 | Condition 4 | Configured | Rel 15 |
| H1 | 2 | 1 | Condition 2/4 | Not configured | SFN |
| H2 | 2 | 1 | Condition 4 | Configured and URLLCScheme Enabler = SFN | SFN |
| H3 | 2 | 2 | Condition 4 | Configured and URLLCScheme Enabler = SFN | SFN |

In Table 20, condition 1 is a condition indicating one entry in pdsch-TimeDomainAllocationList including URLLCRepNum (i.e., >1) in a TDRA by DCI. Condition 2 is a condition indicating one entry in pdsch-TimeDomainAllocationList that does not have URLLCRepNum by DCI but indicating at least one entry having URLLCRepNum. Condition 4 is a condition in which there is no entry in a TDRA including URLLCRepNum.

The above proposal #1 below proposed methods (e.g., Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3, etc.) and proposal #2 below proposed methods (e.g., proposal B #1/proposal B #1-1/proposal B #1-2, etc.) and proposal #3 below proposed methods (e.g., proposal C#1) may be independently applied. However, the present disclosure is not limited to independent use, and one or more proposed methods may be considered and applied together. For example, in the proposed method below proposal #1 the method for configuring/indicating an SFN scheme may also be applied as a method for a base station to configure/indicate an SFN scheme to a terminal in proposal #2. Here, a plurality of QCL RSs configured/indicated to a terminal may respectively correspond to DMRS port(s) of different CDM groups.

In addition, when performing the SFN transmission proposed above, a constraint may be defined to operate only below a specific number of layers (e.g., 1 layer). This is because, for example, when SFN transmission is supported for two or more layers, performance degradation may occur due to the influence of inter-layer interference.

In addition, although the case in which 2 TCI states are indicated is mainly described above, it is not limited to the case of 2 TCI states. The proposed method may also be applied to a plurality of TCI states of 2 or more TCI states. Here, for example, when the number of TCI states indicated to a terminal is three or more, the proposed operation (SFN transmission/SFN-based repeated transmission) may be applied to be contrasted with the Rel-16 operation.

Meanwhile, in the above description, 'SFN transmission' means a method in which a plurality of RSs (/antenna ports) are indicated/configured/assumed as a QCL reference for the same QCL parameter for a single antenna port.

DMRS port(s) through an antenna port field of DCI in the above-described proposed methods (e.g., proposal #1/proposal #2/proposal #3) and sub-proposed methods of each proposal may be determined/indicated, and antenna port(s) may be determined according to an order of the indicated DMRS port(s). Also, a CDM group corresponding to the determined antenna port(s) may be determined. In addition, data may be transmitted/received based on the antenna port(s).

Figure 22:
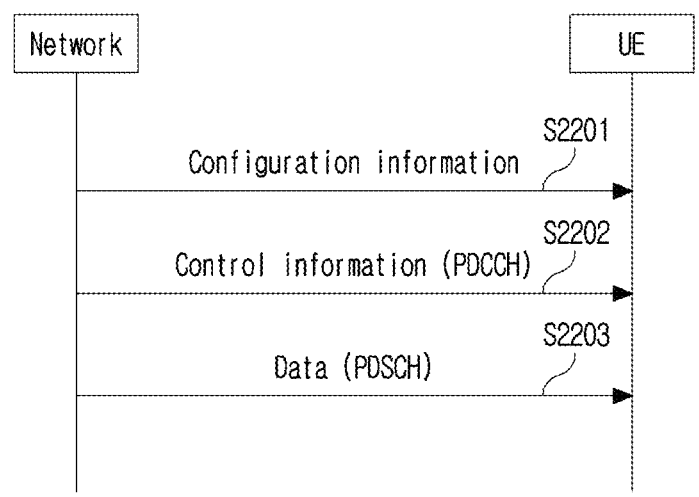
FIG. 22 illustrates a signaling procedure between a terminal and a network according to an embodiment of the present disclosure.

FIG. 22 illustrates a signaling procedure between a terminal and a network according to an embodiment of the present disclosure.

FIG. 22 shows an example of signaling between a network and a UE to which the proposed methods (e.g., Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1, etc.) can be applied. Here, a UE/Network may be an example, and may be substituted with various devices as described in FIGS. 25 and 26. FIG. 22 is only for convenience of description, and does not limit the scope of the present disclosure. In addition, some step(s) shown in FIG. 22 may be omitted depending on circumstances and/or configurations. In addition, in the operation of the network/UE of FIG. 22, the above-described technical contents (e.g., HST-SFN arrangement/M-TRP related operation, etc.) may be referenced/used.

In the following description, a Network may be one base station including a plurality of TRPs, and may be one cell including a plurality of TRPs. Alternatively, a network may include a plurality of remote radio heads (RRHs)/remote radio units (RRUs). As an example, an ideal/non-ideal backhaul may be configured between TRP 1 and TRP 2 included in a network. In addition, the following description will be described based on a plurality of TRPs, but this may be equally extended and applied to transmission through a plurality of panels/cells, and may also be extended and applied to transmission through a plurality of RRHs/RRUs.

In addition, as described above, "TRP" may be applied by being replaced with a term such as a panel, an antenna array, a cell (e.g., macro cell/small cell/pico cell, etc.), TP (transmission point), a base station (gNB, etc.). As described above, a TRP may be classified according to information (e.g., index, ID) on a CORESET group (or CORESET pool). As an example, when one terminal is configured to perform transmission/reception with a plurality of TRPs (or cells), this may mean that a plurality of CORESET groups (or CORESET pools) are configured for one terminal. A configuration of such a CORESET group (or CORESET pool) may be performed through higher layer signaling (e.g., RRC signaling, etc.). In addition, a base station may mean a generic term for an object that transmits and receives data with a terminal. For example, the base station may be a concept including one or more TPs (Transmission Points), one or more TRPs (Transmission and Reception Points), etc. In addition, a TP and/or TRP may include a panel of a base station, a transmission and reception unit, etc.

Although not shown in FIG. 22, a UE and/or a Network may perform a Channel State Information (CSI) related procedure. For example, a UE and/or a network may be configured to perform the above-described CSI-related procedure. Specifically, the above-described CSI measurement and CSI reporting procedures may be performed between a UE and/or a network. For example, based on the information obtained through the CSI-related procedure, configurations related to operations to be described later/operations to be described later may be performed.

In addition, although not shown in FIG. 22, a UE may transmit UE capability information to a network. The UE capability information may include capability information of a UE related to an operation described in the above-described proposed methods (e.g., Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1, etc.).

A UE may receive configuration information from a network (S2201). The configuration information may include system information (SI) and/or scheduling information and/or configuration information related to beam management (BM), etc. For example, the configuration information may include information related to network configuration (i.e., TRP configuration), resource allocation related to multiple TRP-based transmission and reception, etc.

For example, based on the above-described proposed method (e.g. Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1, etc.), the configuration information may include information on whether to operate an SFN (e.g., whether to operate an HST-SFN) and/or whether to configure a plurality of MLs and/or TCI state(s) and/or QCL RS(s) and/or DMRS port(s). For example, whether to perform an SFN operation or whether to perform a transmission/reception operation based on a plurality of MLs may be indicated based on the configuration information. For example, whether to perform an SFN operation is configured for a specific code point for a TCI state may be configured based on the configuration information. For example, a plurality of (different) TCI states may be configured for DMRS port(s) related to a control channel (e.g., PDCCH) based on the configuration information. For example, the configuration information may include a configuration for a CORESET/CORESET group and/or an SS configuration. Here, a configuration for a CORESET may include information related to a QCL RS/TCI state. In addition, an SS configuration including a CORESET configuration may include information related to an additional QCL RS/TCI State. For example, an SFN transmission scheme and/or an ML-based repetition/fraction transmission scheme may be determined/configured based on the number of QCL RS/TCI states (or, conversely, the number of QCL RS/TCI states may be determined based on an SFN transmission scheme and/or an ML-based repetition/fraction transmission scheme). For example, activation/deactivation for a TCI state in which a plurality of TCI states are configured and/or added to a specific CORESET may be configured based on the configuration information. For example, TCI state combination candidates that can be composed of a plurality of TCI states may be configured based on the configuration information. In addition, the configuration information may include information on a TCI state combination.

For example, as described in Proposal C#1 of Proposal #3, whether to perform an SFN operation may be configured using a higher layer parameter (e.g., RepTCIMapping/RepSchemeEnabler). For example, the configuration information may include a new parameter for configuring whether to perform an SFN operation.

The configuration information may be transmitted through a higher layer (e.g., RRC or MAC CE). In addition, when the configuration information is predefined or configured, the corresponding step may be omitted.

For example, the operation of the UE (100/200 in FIGS. 25 and 26) of the above-described step S2201 receiving the configuration information from the Network (100/200 in FIG. 25) may be implemented by a device of FIGS. 25 and 26 to be described below. For example, referring to FIG. 25, one or more processors 102 may control one or more transceivers 106 and/or one or more memories 104 to receive the configuration information, and the one or more transceivers 106 may receive the configuration information from the network.

A UE may receive control information from a Network (S2202). The control information may be received through a control channel (e.g., PDCCH). For example, the control information may be DCI. For example, based on the above-described proposed method (e.g. Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1, etc.), the control information is information on whether to perform an SFN operation (e.g., whether to perform an HST-SFN operation) and/or TCI state(s) and/or QCL RS(s) and/or DMRS port(s) and/or ML-related resource information and/or an antenna port field. For example, a plurality of (different) TCI states may be indicated/configured in a TCI state field in the control information (e.g., DCI). For example, the control information may include information on antenna port to layer mapping, and as described in Proposal B #1/Proposal B #1-1/Proposal B #1-2 of the above-mentioned Proposal 2, an antenna port to layer mapping relationship/the number of transport layers, etc. may be determined/configured.

For example, as described in Proposal C#1 of Proposal #3, a slot level repeat transmission configuration is configured through the configuration information, but when a DMRS port configured based on the control information is included in/corresponds to a plurality of CDM groups, an SFN operation may be configured.

For example, based on the information configured/indicated in step S2201, a UE may perform channel estimation/compensation and may receive the control information. For example, based on the above-described proposed method (e.g. Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1, etc.), a UE may assume SFN transmission, and may perform control channel (e.g., PDCCH) estimation/compensation based on a QCL RS corresponding to a TCI state.

For example, ML-related resource information included in the control information may include resource region (the ML) information for a PDCCH corresponding to the same DCI. For example, a plurality of resource regions (e.g., ML) may be configured/defined, and each resource region may correspond to different QCL RS(s) (/TCI state(s))/TRP. For example, each of the plurality of QCL RS(s) (/TCI state(s)) may sequentially correspond to each resource region of a plurality of resource regions (ML). For example, a control channel (e.g., PDCCH) may be received/transmitted by repetition/fraction based on a plurality of resource regions. For example, a control channel (e.g., PDCCH) may be received/transmitted by repetition/fraction based on the plurality of resource regions, and SFN transmission (e.g., a control channel is received/transmitted based on a plurality of QCL reference signals (/antenna ports) for the same QCL parameter for a single antenna port) may be performed in each resource region.

For example, a CRC of the control information (e.g., DCI) may be scrambled based on an SFN-RNTI, and a UE receiving it may assume that data (/PDSCH) scheduled based on the control information is based on SFN transmission.

For example, the operation of the UE (100/200 in FIGS. 25 and 26) of the above-described step S2202 receiving the control information from the Network (100/200 in FIG. 25) may be implemented by a device of FIGS. 25 and 26 to be described below. For example, referring to FIG. 25, one or more processors 102 may control one or more transceivers 106 and/or one or more memories 104 to receive the control information, and the one or more transceivers 106 may receive the control information from the network side.

A UE may receive data from a Network (S2203). The data may be received through a data channel (e.g., PDSCH). For example, the data may be scheduled based on the control information. In addition, the data may be received based on the information configured/indicated in steps S2201/S2202. For example, based on the information configured/indicated in steps S2201/S2202, a UE may perform channel estimation/compensation and receive the data. For example, based on the above-described proposed method (e.g. Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/

Proposal A #5-3-1/Proposal A #5-3-2/Proposal A #5-3-3/ Proposal B #1/Proposal B #1-1/Proposal B #1-2/Proposal C#1, etc.), a UE may assume SFN transmission and may perform channel estimation/compensation based on a QCL RS corresponding to a TCI state. For example, when a plurality of (different) TCI states are indicated/configured in a TCI state field in the control information (e.g., DCI), assuming that a DMRS port is configured with an SFN based on the plurality of TCI states, channel estimation/compensation may be performed based on QCL RSs corresponding to each TCI state.

For example, the above-mentioned proposal A #5/proposal A #5-1/proposal A #5-2/proposal A #5-3/proposal A #5-3-1/proposal A #5-3-2/As described in proposal A #5-3-3, a QCL RS/TCI state applied when a data channel is received may be determined based on an offset value between control information (e.g., DCI) and the data channel (e.g., PDSCH) scheduled based on the control information. For example, if the offset value is greater than a specific threshold value and there is no TCI information in the control information, a QCL RS/TCI state associated with SFN transmission/transmission based on a plurality of MLs may also be applied to the data channel. For example, if the offset value is greater than a specific threshold value and there is no TCI information in the control information, a specific QCL RS/TCI state (e.g., related resource location/index/QCL RS based on SS configuration, etc.) may be applied to the data channel, and in this case, it may be recognized as a single TRP operation. For example, if the offset value is greater than a specific threshold value and there is no TCI information in the control information, it may be recognized that the data channel (e.g., PDSCH) is received based on one of M-TRP transmission, S-TRP transmission, and SFN transmission.

For example, as described in proposal C#1 of Proposal #3, a UE configured/indicated for SFN operation may assume that when PDSCH/PDCCH repeated transmission is configured/indicated, that a signal configured with an SFN is repeatedly transmitted through a resource region configured/indicated for the repeated transmission.

For example, the data may mean a TB or information/channel (e.g., PDSCH) encoded from a TB. For example, based on the above-described proposed method (e.g. Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1, etc.), a size of a TB may be calculated. When a UE calculates a size of a TB, the contents described in the above-described TBS determination may be used/referenced.

For example, the operation of the UE (100/200 in FIGS. 25 and 26) of the above-described step S2203 receiving the data from the Network (100/200 in FIG. 25) may be implemented by a device of FIGS. 25 and 26 to be described below. For example, referring to FIG. 25, one or more processors 102 may control one or more transceivers 106 and/or one or more memories 104 to receive the data, and the one or more transceivers 106 may receive the data from the network.

As mentioned above, the above-described Network/UE signaling and operation (e.g. Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1/FIG. 22, etc.) may be implemented by a device (e.g., FIGS. 25 and 26) to be described below. For example, a Network (TRP 1/TRP 2) may correspond to a first wireless device, a UE may correspond to a second wireless device, and vice versa may be considered in some cases.

Figure 25:
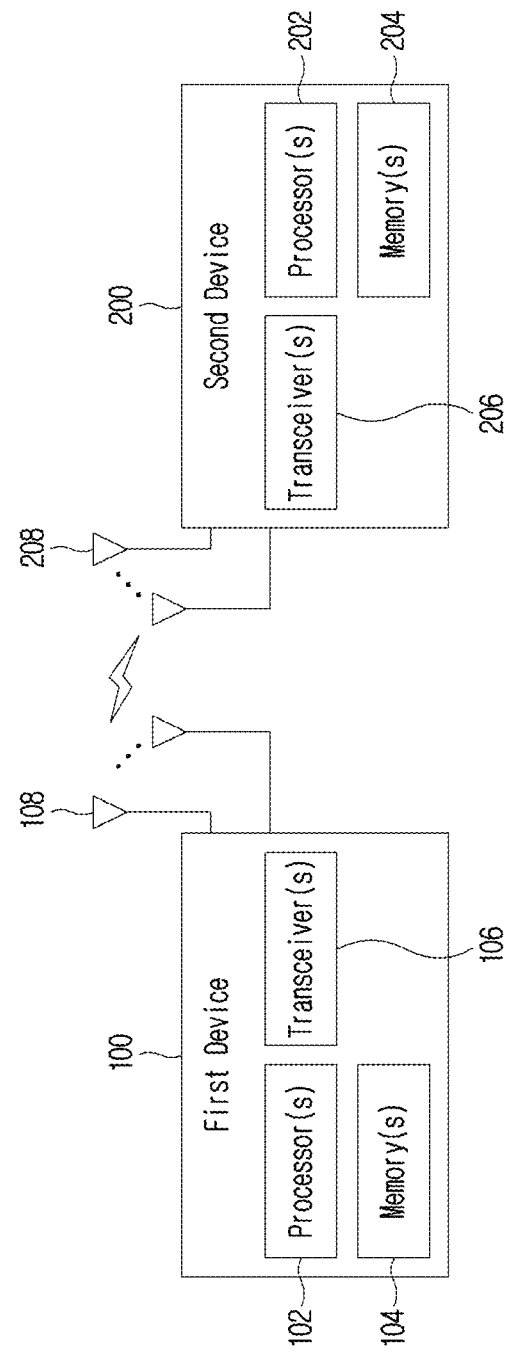
FIG. 25 illustrates a block diagram of a wireless communication device according to an embodiment of the present disclosure.
Figure 26:
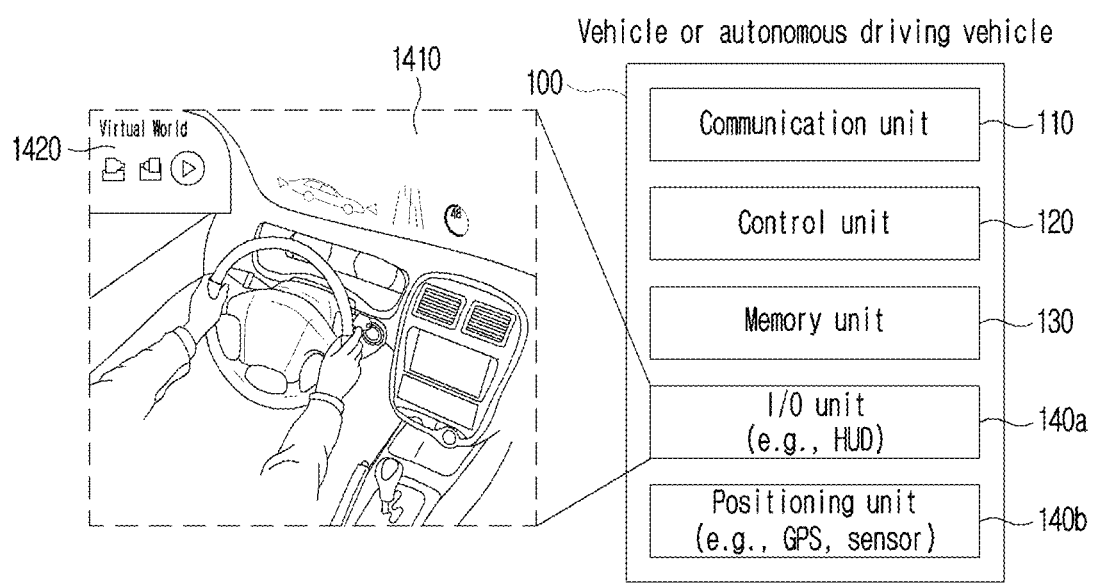
FIG. 26 illustrates a vehicle device according to an embodiment of the present disclosure.

For example, the above-described Network/UE signaling and operation (e.g. Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1/FIG. 22, etc.) may be processed by one or more processors (e.g., 102, 202) of FIGS. 25 and 26, and the above-described Network/UE signaling and operation (e.g. Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1/FIG. 22, etc.) may be stored in a memory (e.g., one or more memories (e.g., 103, 204) of FIG. 25) in a form of instructions/programs (e.g., instruction, executable code) for driving at least processor (e.g., 102, 202) of FIGS. 25 and 26.

Figure 23:
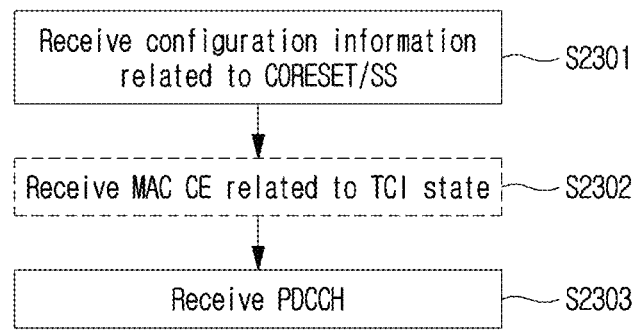
FIG. 23 is a diagram illustrating an operation of a terminal for a method of receiving a PDCCH according to an embodiment of the present disclosure.

FIG. 23 is a diagram illustrating an operation of a terminal for a method of receiving a PDCCH according to an embodiment of the present disclosure.

FIG. 23 exemplifies an operation of a terminal based on the proposed method (e.g., Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1, etc.). An example of FIG. 23 is for convenience of description, and does not limit the scope of the present disclosure. Some step(s) illustrated in FIG. 23 may be omitted depending on circumstances and/or configurations. In addition, a terminal in FIG. 23 is only one example, and may be implemented as a device illustrated in FIGS. 25 and 26 below. For example, the processor 102/202 of FIG. 25 may control to transmit/receive a channel/signal/data/information using the transceiver 106/206, and control to store transmitted or received channel/signal/data/information in the memory 104/204.

In addition, an operation of FIG. 23 may be processed by one or more processors 102, 202 of FIG. 25, and an operation of FIG. 23 may be stored in a memory (e.g., one or more memories (103, 204) of FIG. 25) in a form of instructions/programs (e.g., instruction, executable code) for driving at least processor (e.g., 102, 202) of FIG. 25.

Referring to FIG. 23, a terminal receives configuration information related to a CORESET and/or related to a search space set (SS) from a base station (S2301).

Here, configuration information (e.g., configuration information related to a CORESET) may include TCI state information related to the CORESET. Alternatively, configuration information (e.g., configuration information related to an SS) may include an identifier for a CORESET associated in the configuration information, and configuration information for the CORESET identified by the identifier of the corresponding CORESET may include TCI state information related to the CORESET.

Here, the TCI state information includes information on one or more reference signals in a quasi co-location (QCL) relation with one or more antenna ports of a DMRS of the PDCCH.

Here, since information on the plurality of TCI states is included in the configuration information, the plurality of TCI states may be configured for the CORESET (i.e., CORESET used by a terminal to receive/monitor a PDCCH).

In addition, since each of first configuration information related to the CORESET and second configuration information related to a search space set includes information on one or more TCI states, a plurality of TCI states for the CORESET may be configured. In this case, if second configuration information includes information on a plurality of TCI states, a plurality of TCI states included in the second configuration information may be configured in the CORESET with priority (i.e., information on a TCI state in first configuration information may be ignored).

A terminal may receive a MAC CE related to a TCI state from a base station (S2302).

Here, the configuration information of step S2301 includes a plurality of TCI state candidates for the CORESET (i.e., CORESET used by a terminal to receive/monitor a PDCCH), and the plurality of TCI states among the plurality of TCI state candidates are indicated by the MAC CE of step S2302, so that the plurality of TCI states may be configured for the CORESET.

In addition, the configuration information of step S2301 includes a plurality of TCI state candidates for the CORESET (i.e., CORESET used by a terminal to receive/monitor a PDCCH), and after one TCI state among the plurality of TCI state candidates is configured by a first MAC CE in step S2302, activation of an additional TCI state is indicated by another second MAC CE in step S2302, so that the plurality of TCI states may be configured for the CORESET.

In addition, the configuration information of step S2301 includes information on TCI state combination candidates that can be composed of a plurality of TCI states for the CORESET (i.e., CORESET used by a terminal to receive/monitor a PDCCH), and the plurality of TCI states may be configured for the CORESET by being indicated a specific TCI state combination among the TCI state combination candidates by the MAC CE in step S2302.

As described above, a plurality of TCI states for a corresponding CORESET (i.e., CORESET used by a terminal to receive/monitor a PDCCH) only by configuration information for a CORESET and/or configuration information for an SS may be configured. In this case, step S2302 may be omitted.

A terminal receives a PDCCH from a base station (S2303). That is, a terminal receives DCI from a base station through a PDCCH.

Here, a terminal may receive a PDCCH on the configured SS and/or CORESET.

Here, based on the plurality of TCI states being configured in the CORESET according to steps S2301 and/or S2302 above, a terminal may assume that one or more antenna ports of the DMRS of the PDCCH are transmitted through an SFN based on the plurality of TCI states. In this case, a terminal may perform channel estimation and/or channel compensation for the PDCCH based on each channel value corresponding to reference signals of the plurality of TCI states. In addition, it may be assumed that a PDSCH scheduled by the PDCCH is also transmitted through an SFN.

In addition, for the same DCI, a terminal may repeatedly receive the PDCCH at a plurality of transmission occasions. In this case, each transmission time occasion of the PDCCH may correspond to a different TCI state among a plurality of DCI states configured in a CORESET related to the PDCCH.

Although not described in FIG. 23, the proposed methods (e.g., Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1, etc.) according to the present disclosure described above may be performed together with the operation of a terminal of FIG. 23.

Figure 24:
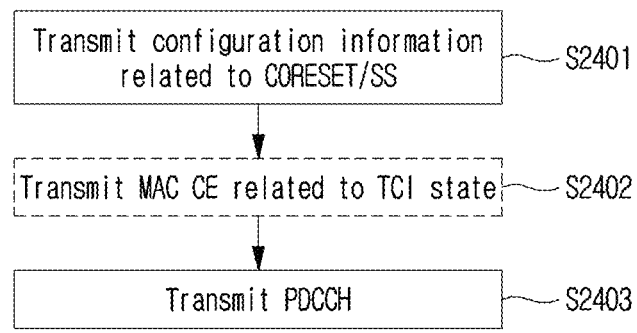
FIG. 24 is a diagram illustrating an operation of a base station for a method of transmitting a PDCCH according to an embodiment of the present disclosure.

FIG. 24 is a diagram illustrating an operation of a base station for a method of transmitting a PDCCH according to an embodiment of the present disclosure.

FIG. 24 exemplifies an operation of a terminal based on the proposed method (e.g., Proposal A #1/Proposal A #1-1/Proposal A #1-1-1/Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/Proposal C#1, etc.). An example of FIG. 24 is for convenience of description, and does not limit the scope of the present disclosure. Some step(s) illustrated in FIG. 24 may be omitted depending on circumstances and/or configurations. In addition, a base station in FIG. 24 is only one example, and may be implemented as a device illustrated in FIGS. 25 and 26 below. For example, the processor 102/202 of FIG. 25 may control to transmit/receive a channel/signal/data/information using the transceiver 106/206, and control to store transmitted or received channel/signal/data/information in the memory 104/204.

Referring to FIG. 24, a base station transmits configuration information related to a CORESET and/or related to a search space set (SS) to a terminal (S2401).

Here, configuration information (e.g., configuration information related to a CORESET) may include TCI state information related to the CORESET. Alternatively, configuration information (e.g., configuration information related to an SS) may include an identifier for a CORESET associated in the configuration information, and configuration information for the CORESET identified by the identifier of the corresponding CORESET may include TCI state information related to the CORESET.

Here, the TCI state information includes information on one or more reference signals in a quasi co-location (QCL) relation with one or more antenna ports of a DMRS of the PDCCH.

Here, since information on the plurality of TCI states is included in the configuration information, the plurality of TCI states may be configured for the CORESET (i.e., CORESET used by a terminal to receive/monitor a PDCCH).

In addition, since each of first configuration information related to the CORESET and second configuration information related to a search space set includes information on one or more TCI states, a plurality of TCI states for the CORESET may be configured. In this case, if second configuration information includes information on a plurality of TCI states, a plurality of TCI states included in the second configuration information may be configured in the CORESET with priority (i.e., information on a TCI state in first configuration information may be ignored).

A base station may transmit a MAC CE related to a TCI state to a terminal (S2402).

Here, the configuration information of step S2401 includes a plurality of TCI state candidates for the CORESET (i.e., CORESET used by a terminal to receive/monitor a PDCCH), and the plurality of TCI states among the plurality of TCI state candidates are indicated by the MAC CE of step S2402, so that the plurality of TCI states may be configured for the CORESET.

In addition, the configuration information of step S2401 includes a plurality of TCI state candidates for the CORESET (i.e., CORESET used by a terminal to receive/monitor a PDCCH), and after one TCI state among the plurality of TCI state candidates is configured by a first MAC CE in step S2402, activation of an additional TCI state is indicated by another second MAC CE in step S2402, so that the plurality of TCI states may be configured for the CORESET.

In addition, the configuration information of step S2401 includes information on TCI state combination candidates that can be composed of a plurality of TCI states for the CORESET (i.e., CORESET used by a terminal to receive/monitor a PDCCH), and the plurality of TCI states may be configured for the CORESET by being indicated a specific TCI state combination among the TCI state combination candidates by the MAC CE in step S2402.

As described above, a plurality of TCI states for a corresponding CORESET (i.e., CORESET used by a terminal to receive/monitor a PDCCH) only by configuration information for a CORESET and/or configuration information for an SS may be configured. In this case, step S2402 may be omitted.

A base station transmits a PDCCH to a terminal (S2403). That is, a base station transmits DCI to a terminal through a PDCCH.

Here, a base station may transmit a PDCCH on the SS and/or CORESET configured to a terminal.

Here, based on the plurality of TCI states being configured in the CORESET according to steps S2401 and/or S2402 above, a terminal may assume that one or more antenna ports of the DMRS of the PDCCH are transmitted through an SFN based on the plurality of TCI states. In this case, a terminal may perform channel estimation and/or channel compensation for the PDCCH based on each channel value corresponding to reference signals of the plurality of TCI states. In addition, it may be assumed that a PDSCH scheduled by the PDCCH is also transmitted through an SFN.

Although not described in FIG. 24, the proposed methods (e.g., Proposal A #1/Proposal A #1-1/Proposal A #1-1-1/ Proposal A #1-2/Proposal A #2/Proposal A #2-1/Proposal A #2-1-1/Proposal A #2-1-2/Proposal A #2-2/Proposal A #2-2-1/Proposal A #2-3/Proposal A #2-3-1/Proposal A #2-4/Proposal A #2-4-1/Proposal A #2-4-2/Proposal A #3/Proposal A #4/Proposal A #5/Proposal A #5-1/Proposal A #5-2/Proposal A #5-3/Proposal A #5-3-1/Proposal A #5-3-2/Proposal A #5-3-3/Proposal B #1/Proposal B #1-1/Proposal B #1-2/ Proposal C#1, etc.) according to the present disclosure described above may be performed together with the operation of a base station of FIG. 24.

General Device to Which the Present Disclosure May be Applied

FIG. 25 is a diagram which illustrates a block diagram of a wireless communication device according to an embodiment of the present disclosure.

In reference to FIG. 25, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs(Application Specific Integrated Circuit), one or more DSPs(Digital Signal Processor), one or more DSPDs(Digital Signal Processing Device), one or more PLDs(Programmable Logic Device) or one or more FPGAs(Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

FIG. 26 illustrates a vehicle device according to an embodiment of the present disclosure.

In reference to FIG. 26, a vehicle 100 may include a communication unit 110, a control unit 120, a memory unit 130, an input and output unit 140a and a positioning unit 140b.

A communication unit 110 may transmit and receive a signal (e.g., data, a control signal, etc.) with external devices of other vehicle, or a base station, etc. A control unit 120 may perform a variety of operations by controlling elements of a vehicle 100. A control unit 120 may control a memory unit 130 and/or a communication unit 110 and may be configured to implement descriptions, functions, procedures, proposals, methods and/or operation flow charts included in the present disclosure. A memory unit 130 may store data/a parameter/a program/a code/a command supporting a variety of functions of a vehicle 100. An input and output unit 140a may output an AR/VR object based on information in a memory unit 130. An input and output unit 140a may include HUD. A positioning unit 140b may obtain position information of a vehicle 100. Position information may include absolute position information, position information in a driving lane, acceleration information, position information with a surrounding vehicle, etc. of a vehicle 100. A positioning unit 140b may include a GPS and a variety of sensors.

In an example, a communication unit 110 of a vehicle 100 may receive map information, traffic information, etc. from an external server and store them in a memory unit 130. A positioning unit 140b may obtain vehicle position information through a GPS and a variety of sensors and store it in a memory unit 130. A control unit 120 may generate a virtual object based on map information, traffic information and vehicle position information, etc. and an input and output unit 140a may indicate a generated virtual object on a window in a vehicle 1410, 1420. In addition, a control unit 120 may determine whether a vehicle 100 normally operates in a driving lane based on vehicle position information. When a vehicle 100 is abnormally out of a driving lane, a control unit 120 may indicate a warning on a window in a vehicle through an input and output unit 140a. In addition, a control unit 120 may send a warning message on abnormal driving to surrounding vehicles through a communication unit 110. According to a situation, a control unit 120 may transmit position information of a vehicle and information on a driving/vehicle problem to a relative agency through a communication unit 110.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN(Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL(non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN(personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

The invention claimed is:

1. A method performed by a terminal in a wireless communication system, the method comprising:

receiving, from a base station, configuration information related to a control resource set (CORESET), wherein the configuration information includes a list of transmission configuration indicator (TCI) states, and each TCI state in the list of TCI states includes information for configuring a quasi co-location (QCL) relationship between one or more reference signals and one or more antenna ports of a demodulation reference signal (DMRS) of a physical downlink control channel (PDCCH);

receiving, from the base station, a medium access control (MAC) control element (CE) for indicating two TCI states of the CORESET among the list of TCI states; and receiving, from the base station, a first PDCCH in the CORESET, wherein, based on the two TCI states being activated for the CORESET by receiving the MAC CE, one or more antenna ports of a DMRS of the first PDCCH in the CORESET are quasi co-located (QCLed) with reference signals of the two TCI states, wherein the MAC CE includes i) a CORESET identifier (ID) field, ii) a first TCI state ID field indicating one of the two TCI states applicable to the CORESET identified by the CORESET ID field and iii) a second TCI state ID field indicating the other of the two TCI states applicable to the CORESET identified by the CORESET ID field.

2. The method of claim 1, wherein, based on the two TCI states being configured for the CORESET, it is assumed that the first PDCCH are transmitted through a single frequency network (SFN) based on the two TCI states.

3. The method of claim 1, wherein, based on each channel value corresponding to the reference signals of the two TCI states, channel estimation and/or channel compensation for the first PDCCH is performed.

4. The method of claim 1, wherein, based on the first PDCCH being repeatedly transmitted in a plurality of transmission occasions for the same downlink control information (DCI), each of the plurality of transmission occasions corresponds to a different TCI state of the two TCI states.

5. A terminal configured to operate in a wireless communication system, the terminal comprising:

at least one transceiver for transmitting and receiving a radio signal; and at least one processor for controlling the at least one transceiver, wherein the at least one processor is configured to:

receive, from a base station, configuration information related to a control resource set (CORESET), wherein the configuration information includes a list of transmission configuration indicator (TCI) states, and each TCI state in the list of TCI states includes information for configuring a quasi co-location (QCL) relationship between one or more reference signals and one or more antenna ports of a demodulation reference signal (DMRS) of a physical downlink control channel (PDCCH);

receive, from the base station, a medium access control (MAC) control element (CE) for indicating two TCI states of the CORESET among the list of TCI states; and receive, from the base station, a first PDCCH in the CORESET, wherein, based on the two TCI states being activated for the CORESET by receiving the MAC CE, one or more antenna ports of a DMRS of the first PDCCH in the CORESET are quasi co-located (QCLed) with reference signals of the two TCI states, wherein the MAC CE includes i) a CORESET identifier (ID) field, ii) a first TCI state ID field indicating one of the two TCI states applicable to the CORESET identified by the CORESET ID field and iii) a second TCI state ID field indicating the other of the two TCI states applicable to the CORESET identified by the CORESET ID field.

6. A base station configured to operate in a wireless communication system, the base station comprising:

at least one transceiver for transmitting and receiving a radio signal; and at least one processor for controlling the at least one transceiver, wherein the at least one processor is configured to:

transmit, to a terminal, configuration information related to a control resource set (CORESET), wherein the configuration information includes a list of transmission configuration indicator (TCI) states, and each TCI state in the list of TCI states includes information for configuring a quasi co-location (QCL) relationship between one or more reference signals and one or more antenna ports of a demodulation reference signal (DMRS) of a physical downlink control channel (PDCCH);

transmit, to the terminal, a medium access control (MAC) control element (CE) for indicating two TCI states of the CORESET among the list of TCI states; and transmit, to the terminal, a first PDCCH in the CORESET, wherein, based on the two TCI states being activated for the CORESET by receiving the MAC CE, one or more antenna ports of a DMRS of the first PDCCH in the CORESET are quasi co-located (QCLed) with reference signals of the two TCI states, wherein the MAC CE includes i) a CORESET identifier (ID) field, ii) a first TCI state ID field indicating one of the two TCI states applicable to the CORESET identified by the CORESET ID field and iii) a second TCI state ID field indicating the other of the two TCI states applicable to the CORESET identified by the CORESET ID field.

* * * * *